United States Patent
Qian et al.

(10) Patent No.: US 8,843,792 B2
(45) Date of Patent: Sep. 23, 2014

(54) METHOD AND APPARATUS FOR REDUCING FALSE DETECTION OF CONTROL INFORMATION

(75) Inventors: Xing Qian, Conestogo (CA); Yangwen Liang, Waterloo (CA); Jonathan Otto Swoboda, Petersburg (CA); Phat Hong Tran, Waterloo (CA)

(73) Assignee: BlackBerry Limited, Waterloo (CA)

( * ) Notice: Subject to any disclaimer, the term of this patent is extended or adjusted under 35 U.S.C. 154(b) by 6 days.

(21) Appl. No.: 13/524,492

(22) Filed: Jun. 15, 2012

(65) Prior Publication Data

US 2013/0205176 A1    Aug. 8, 2013

Related U.S. Application Data

(60) Provisional application No. 61/594,570, filed on Feb. 3, 2012.

(51) Int. Cl.
| | |
|---|---|
| G06F 11/08 | (2006.01) |
| H04L 1/00 | (2006.01) |
| H04L 1/20 | (2006.01) |
| G06F 11/24 | (2006.01) |

(52) U.S. Cl.
CPC .............. *H04L 1/20* (2013.01); *H04L 1/0057* (2013.01); *H04L 1/0045* (2013.01)
USPC .......................................... 714/704; 714/752

(58) Field of Classification Search
CPC ....... H04L 1/20; H04L 1/0057; H04L 1/0045; G06F 11/076; H03M 13/116; H03M 13/09
See application file for complete search history.

(56) References Cited

U.S. PATENT DOCUMENTS

| | | | | |
|---|---|---|---|---|
| 6,061,823 A | * | 5/2000 | Nara | 714/758 |
| 2001/0000221 A1 | * | 4/2001 | Chen et al. | 375/340 |

(Continued)

FOREIGN PATENT DOCUMENTS

| | | |
|---|---|---|
| CN | 101594205 | 12/2009 |
| CN | 101789823 | 7/2010 |

OTHER PUBLICATIONS

TS 36.212, "3rd Generation Partnership Project; Technical Specification Group Radio Access Network; Evolved Universal Terrestrial Radio Access (E-UTRA); Multiplexing and channel coding (Release 8)", Version 8.8.0, Dec. 2009; 60 pages.

(Continued)

*Primary Examiner* — Ajay Bhatia
*Assistant Examiner* — Dipakkumar Gandhi
(74) *Attorney, Agent, or Firm* — Fitch, Even, Tabin & Flannery LLP

(57) ABSTRACT

A control channel may be used to transmit control information, such as Downlink Control Information (DCI), to a mobile device from a network component, such as a base station or a base node. The mobile device may use a blind decoding scheme to detect DCIs. A DCI may be falsely detected by the mobile device. According to some embodiments, data that has been decoded by a blind decoder, from buffer data for a candidate control channel, is re-encoded. The re-encoded data is compared to buffer data for the control channel. The decoded data is treated as control information dependent on the comparison of the re-encoded data with the buffer data. In some embodiments, comparing the re-encoded data to the buffer data includes generating a metric as a function of a degree of similarity between the re-encoded data and the buffer data. The metric may be compared to a threshold.

21 Claims, 11 Drawing Sheets

(56) References Cited

U.S. PATENT DOCUMENTS

| | | | |
|---|---|---|---|
| 2004/0091067 A1* | 5/2004 | Ammer et al. | 375/341 |
| 2007/0211786 A1* | 9/2007 | Shattil | 375/141 |
| 2010/0034139 A1 | 2/2010 | Love et al. | |
| 2010/0279628 A1 | 11/2010 | Love et al. | |
| 2010/0296467 A1 | 11/2010 | Pelletier et al. | |
| 2010/0302983 A1 | 12/2010 | McBeath et al. | |
| 2010/0304689 A1 | 12/2010 | McBeath et al. | |
| 2010/0312469 A1* | 12/2010 | Chen | 701/207 |
| 2011/0044261 A1 | 2/2011 | Cai et al. | |
| 2011/0103509 A1* | 5/2011 | Chen et al. | 375/295 |
| 2011/0110315 A1 | 5/2011 | Chen et al. | |
| 2011/0182385 A1 | 7/2011 | Doan et al. | |
| 2011/0255631 A1 | 10/2011 | Pi | |
| 2011/0271169 A1 | 11/2011 | Pi | |
| 2011/0274071 A1 | 11/2011 | Lee et al. | |
| 2012/0151285 A1* | 6/2012 | Aue | 714/704 |

OTHER PUBLICATIONS

TS 36.211, "3rd Generation Partnership Project; Technical Specification Group Radio Access Network; Evolved Universal Terrestrial Radio Access (E-UTRA); Physical channels and modulation (Release 8)", Version 8.9.0, Dec. 2009; 83 pages.

TS 36.213, "3rd Generation Partnership Project; Technical Specification Group Radio Access Network; Evolved Universal Terrestrial Radio Access (E-UTRA); Physical layer procedures (Release 8)", Version 8.8.0, Sep. 2009; 77 pages.

Moosavi, Reza et al.; "A Fast Scheme for Blind Identification of Channel Codes", Linkoping University Pre Print, 2011; 5 pages.

Cheng, Paul et al.; "Proposed Baseline Content on the Synchronisation Channel for the 802.16m SDD", IEEE 802.16 Broadband Wireless Access Working Group, p. 2, section 1.2.1.1; Jul. 17, 2008; 6 pages.

* cited by examiner

METHOD AND APPARATUS FOR REDUCING FALSE DETECTION OF CONTROL INFORMATION

RELATED APPLICATION

The present patent application claims the benefit of U.S. Provisional Patent Application Ser. No. 61/594,570, filed on Feb. 3, 2012, the entire contents of which are incorporated herein by reference.

FIELD OF THE DISCLOSURE

Aspects of the disclosure relate to detection of control information transmitted on a control channel. Specifically, aspects relate to the reduction of false detections of control information by a blind decoder.

BACKGROUND

A control channel may be used to transmit control information regarding a mobile device from a network component, such as a base station or a base node. Control information may include information regarding resource assignments, modulation and coding scheme, power control, precoding and/or other information for controlling the operation of a mobile device or a group of mobile devices. In Long Term Evolution (LTE) and LTE-Advance (LTE-A) standards, a Physical Downlink Control Channel (PDCCH) contains a message transmitted by a network component known as a Downlink Control Information (DCI) message. For simplicity, a control information message will be referred to herein as simply a CI, and a DCI message will simply be referred to herein as a DCI. Several DCIs can generally be transmitted in a subframe. In a multiple user system, DCIs may be transmitted that are intended for all users within a cell. Other DCIs may be intended only for a specific mobile station. Different DCI formats may be used for carrying different types of control information. Information regarding specific DCI formats, in LTE systems, can be found in TS 36.212, "3rd Generation Partnership Project; Technical Specification Group Radio Access Network; Evolved Universal Terrestrial Radio Access (E-UTRA); Multiplexing and channel coding (Release 8)" Section 5.3.3, Version 8.8.0, 2009-12, the entire contents of which are incorporated by reference.

Multiple control channel formats are possible. Conventionally, a mobile device will not know the format of a control channel carrying a CI for the mobile station before a subframe containing the CI is received. A "blind" decoder in the mobile device may decode several hypothetical or "candidate" control channel formats in an attempt to decode CI intended for the mobile device. A CI that might have been transmitted on a candidate control channel may be referred to herein as a "possible CI". A mobile device may identify whether it has received a CI transmission correctly by means of a Cyclic Redundancy Check (CRC) appended to each CI for error detection. The CRC may, for example in LTE and LTE-A, be 16-bits in length. Typically, each CRC is scrambled with the intended mobile device identity, known as Radio Network Temporary Identifier (RNTI), to reduce PDCCH transmission payload (see TS 36.211, "3rd Generation Partnership Project; Technical Specification Group Radio Access Network; Evolved Universal Terrestrial Radio Access (E-UTRA); Physical channels and modulation (Release 8)", Version 8.9.0, 2009-12, Section 5.3.3.2). The RNTI identifies the mobile station for which a CI is intended. Scrambling the CRC with the RNTI, while increasing efficiency by reducing the total number of bits that must be transmitted, also increases the probability of CI false detection for the PDCCH blind decoder unit in the mobile device.

In an LTE system, a mobile device may monitor a set of possible or "candidate" PDCCHs. Multiple aggregation levels (e.g. 1, 2, 4, 8) are defined by "search spaces", each search space having set of candidate PDCCHs. Each candidate PDCCH may include a defined group of Control Channel Elements (CCEs) that each, in turn, includes a defined group of Resource Elements (REs). Both common search spaces and mobile device-specific search spaces are defined in an LTE system. In an LTE system, for each subframe, there are a maximum of 22 candidate PDCCHs that a blind decoder may attempt to decode. For each of the candidate PDCCHs, two different DCI payload sizes are possible, and thus a blind decoder may make a maximum of 44 attempts for each subframe to decode a DCI.

Since each possible type of CI has defined structure, conventional CI false detection reduction may be done in the CI parsing unit in software after a blind decoder. However, possible false detected CIs can pass the parsing unit, and throughput performance may be harmed by falsely detected CIs.

BRIEF DESCRIPTION OF THE DRAWINGS

Some embodiments will now be described in greater detail with reference to the accompanying diagrams, in which.

DETAILED DESCRIPTION

Figure 1:
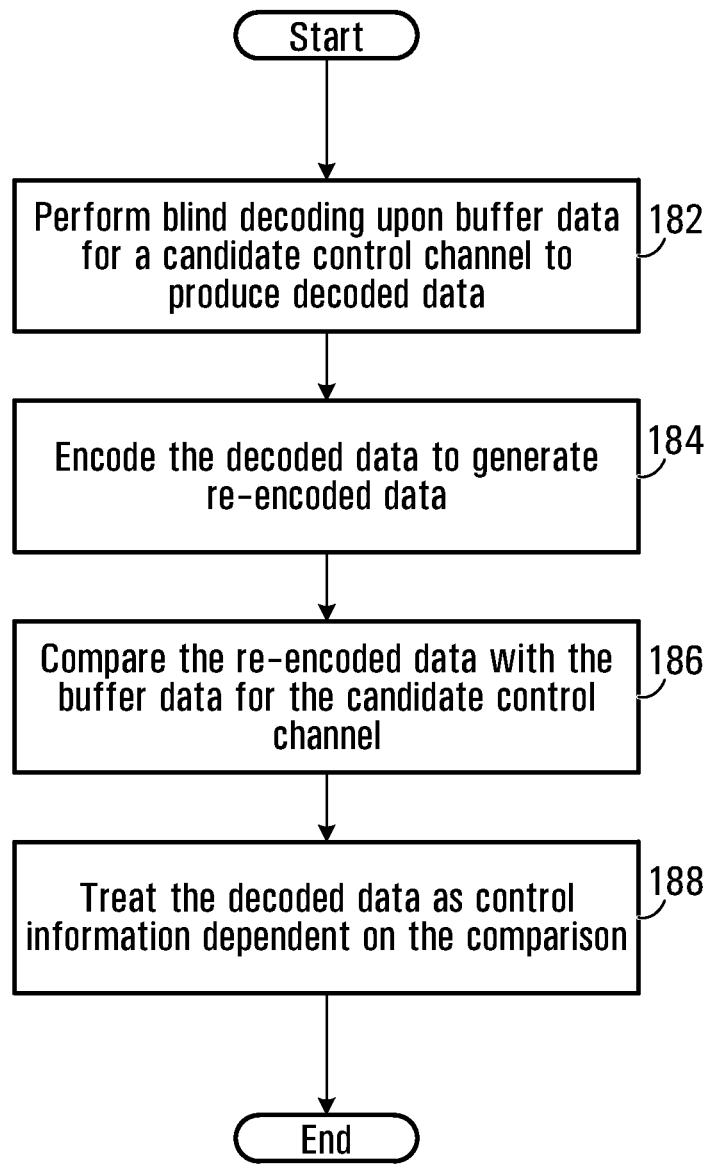
FIG. 1 is a flowchart of an example method for reducing false detection of control information according to some embodiments.

In accordance with one aspect, there is provided a method comprising: performing blind decoding upon buffer data for a candidate control channel to produce decoded data; encoding the decoded data to generate re-encoded data; comparing the re-encoded data with the buffer data for the candidate control channel; and treating the decoded data as control information dependent on the comparison of the re-encoded data with the buffer data.

In some embodiments, the decoded data comprises possible control information.

In some embodiments, the re-encoded data comprises re-encoded control information.

In some embodiments, treating the decoded data as control information dependent on the comparison of the re-encoded data with the buffer data comprises treating the decoded data as either false control information or valid control information as a function of the comparison of the re-encoded data with the buffer data.

In some embodiments, treating the decoded data as valid control information comprises parsing the decoded data.

In some embodiments, treating the decoded data as false control information comprises discarding the decoded data.

In some embodiments, the control information is Downlink Control Information (DCI).

In some embodiments, comparing the re-encoded data with the buffer data comprises determining a metric as a function of a degree of similarity between the re-encoded data and the buffer data, and treating the decoded data as control information dependent on the comparison of the re-encoded data with the buffer data comprises comparing the metric to a threshold.

In some embodiments, the buffer data comprises soft bits.

In some embodiments, the metric comprises an average accumulated distance between the soft bits of the buffer data and bits of the re-encoded data.

In some embodiments: the threshold is an average accumulated distance threshold value; if the average accumulated distance between the soft bits of the buffer data and the bits of the re-encoded data is greater than or equal to the threshold, then treating the decoded data as control information dependent on the comparison of the re-encoded data with the buffer data further comprises treating the decoded data as false control information; and if the average accumulated distance between the soft bits of the buffer data and the bits of the re-encoded data is less than the threshold, then treating the decoded data as control information dependent on the comparison of the re-encoded data with the buffer data further comprises treating the decoded data as valid control information.

In some embodiments, the buffer data comprises hard bits.

In some embodiments, comparing the re-encoded data with the buffer data comprises performing a bit-by-bit comparison of the hard bits of the buffer data and the re-encoded data and the metric is Bit Error Rate (BER).

In some embodiments: the threshold is a BER threshold value; if the determined BER is greater than or equal to the threshold, then treating the decoded data as control information dependent on the comparison of the re-encoded data with the buffer data further comprises treating the decoded data as false control information; and if the determined BER is less than the threshold, then treating the decoded data as control information dependent on the comparison of the re-encoded data with the buffer data further comprises treating the decoded data as valid control information.

In some embodiments, the buffer data is received from a control channel buffer, the candidate control channel comprising at least one Control Channel Elements (CCEs).

In some embodiments, performing blind decoding upon the buffer data for the candidate control channel to produce the decoded data comprises performing a Cyclic Redundancy Check (CRC) check of the decoded data.

In some embodiments: the buffer data comprises soft bits; the method further comprises determining a number of the soft bits for the candidate control channel that meet a soft bit reliability threshold, and determining whether said number meets a buffer data reliability threshold; and encoding the decoded data to generate re-encoded data, comparing the re-encoded data with the buffer data for the candidate control channel, and treating the decoded data as the control information dependent on the comparison of the re-encoded data with the buffer data comprises: only if said number meets the buffer data reliability threshold, encoding the decoded data to generate re-encoded data, comparing the re-encoded data with the buffer data for the candidate control channel, and treating the decoded data as the control information dependent on the comparison of the re-encoded data with the buffer data.

In accordance with another aspect, there is provided an apparatus comprising: a decoder that performs blind decoding upon buffer data for a candidate control channel to produce decoded data; an encoder that encodes the decoded data to generate re-encoded data; a comparison module that compares the re-encoded data with buffer data for the candidate control channel; and a validation module that treats the decoded data as control information dependent on the comparison of the re-encoded data with the buffer data.

In some embodiments, the decoded data comprises possible control information.

In some embodiments, the re-encoded data comprises re-encoded control information.

In some embodiments, treating the decoded data as control information dependent on the comparison of the re-encoded data with the buffer data comprises treating the decoded data as either false control information or valid control information as a function of the comparison of the re-encoded data with the buffer data.

In some embodiments, the apparatus further comprises a control information parser unit, and treating the decoded data as valid control information comprises passing the decoded data to the control information parser unit; and treating the decoded data as false control information comprises not passing the decoded data to the control information parser unit.

In some embodiments, the control information is Downlink Control Information (DCI).

In some embodiments, the comparison module determines a metric as a function of a degree of similarity between the re-encoded data and the buffer data; and the validation module compares the metric to a threshold.

In some embodiments, the buffer data comprises soft bits.

In some embodiments, the metric determined by the comparison module is an average accumulated distance between the soft bits of the buffer data and bits of the re-encoded data.

In some embodiments: the threshold is an average accumulated distance threshold value; if the average accumulated distance between the soft bits of the buffer data and the bits of the re-encoded data is greater than or equal to the threshold, then treating the decoded data as control information dependent on the comparison of the re-encoded data with the buffer data further comprises treating the decoded data as false control information; and if the average accumulated distance between the soft bits of the buffer data and the bits of the re-encoded data is less than the threshold, then treating the decoded data as control information dependent on the comparison of the re-encoded data with the buffer data further comprises treating the decoded data as valid control information.

In some embodiments, the buffer data comprises hard bits.

In some embodiments, the metric is a Bit Error Rate (BER) determined by performing a bit-by-bit comparison of the hard bits of the buffer data and the re-encoded data.

In some embodiments: the threshold is a BER threshold value; if the BER is greater than or equal to the threshold, then treating the decoded data as control information dependent on the comparison of the re-encoded data with the buffer data further comprises treating the decoded data as false control information; and if the BER is less than the threshold, then treating the decoded data as control information dependent on the comparison of the re-encoded data with the buffer data further comprises treating the decoded data as valid control information.

In some embodiments, the candidate control channel is one of a plurality of candidate control channels and the buffer data comprises respective buffer data for each of the plurality of candidate control channels; the decoded data is one of a plurality of decoded data messages, each decoded data message corresponding to a respective one of the plurality of candidate control channels; the encoder is one of a plurality of encoders, each encoder encoding a respective one of the plurality of decoded data messages to produce respective re-encoded data; the comparison module is one of a plurality of comparison modules, each comparison module corresponding to a respective one of the plurality of encoders, and each comparison module comparing the respective re-encoded data with the respective buffer data; and the validation module is one of a plurality of validation modules, each validation module corresponding to a respective one of the plurality of comparison modules and treating the respective decoded data message as respective control information dependent on the comparison of the respective re-encoded data with the respective buffer data.

In some embodiments, the apparatus further comprises a control information parser unit, and each comparison module determines a respective metric as a function of a degree of similarity between the respective re-encoded data and the respective buffer data, and treating the decoded data as control information dependent on the comparison of the re-encoded data with the buffer data comprises, for each of the plurality of decoded data messages, either passing the decoded data message together with the respective metric to the parser unit or discarding the decoded data message as a function of the comparison.

In some embodiments, the decoder comprises a Cyclic Redundancy Check (CRC) checking module that performs a CRC check of the decoded data.

In accordance with another aspect, there is provided a computer readable medium having computer-readable instructions stored thereon that, when executed by a computer, cause the computer to perform the method as described above or below.

In some embodiments: the buffer data comprises soft bits; the apparatus further comprises a soft bit reliability checking module that determines a number of the soft bits for the candidate control channel that meet a soft bit reliability threshold, and determines whether said number meets a buffer data reliability threshold; and only if said number meets the buffer data reliability threshold, the encoder encodes the decoded data to generate re-encoded data, the comparison module compares the re-encoded data with the buffer data for the candidate control channel, and the validation module treats the decoded data as control information dependent on the comparison of the re-encoded data with the buffer data.

Some embodiments described herein may be suited for use in Long Term Evolution (LTE) systems such as, for example, Evolved Universal Terrestrial Radio Access (E-UTRA) (Release 8) although embodiments are not limited to LTE/E-UTRA systems. Information regarding E-UTRA systems may be found in the following:

TS 36.211, "3rd Generation Partnership Project; Technical Specification Group Radio Access Network; Evolved Universal Terrestrial Radio Access (E-UTRA); Physical channels and modulation (Release 8)", Version 8.9.0, 2009-12, the content of which is hereby incorporated by reference in its entirety;

TS 36.212, "3rd Generation Partnership Project; Technical Specification Group Radio Access Network; Evolved Universal Terrestrial Radio Access (E-UTRA); Multiplexing and channel coding (Release 8)", Version 8.8.0, 2009-12, the content of which is hereby incorporated by reference in its entirety; and TS 36.213, "3rd Generation Partnership Project; Technical Specification Group Radio Access Network; Evolved Universal Terrestrial Radio Access (E-UTRA); Physical layer procedures (Release 8)", Version 8.8.0, 2009-09, the content of which is hereby incorporated by reference in its entirety.

Some embodiments may be suited for use in LTE-Advance (LTE-A) systems such as, for example, Evolved Universal Terrestrial Radio Access (E-UTRA) (Release 10) although embodiments are not limited to LTE-A/E-UTRA systems. Information regarding E-UTRA systems may be found in the following:

TS 36.211, "3rd Generation Partnership Project; Technical Specification Group Radio Access Network; Evolved Universal Terrestrial Radio Access (E-UTRA); Physical channels and modulation (Release 10)", Version 10.4.0, 2011-12, the content of which is hereby incorporated by reference in its entirety;

TS 36.212, "3rd Generation Partnership Project; Technical Specification Group Radio Access Network; Evolved Universal Terrestrial Radio Access (E-UTRA); Multiplexing and channel coding (Release 10)", Version 10.4.0, 2011-12, the content of which is hereby incorporated by reference in its entirety; and TS 36.213, "3rd Generation Partnership Project; Technical Specification Group Radio Access Network; Evolved Universal Terrestrial Radio Access (E-UTRA); Physical layer procedures (Release 10)", Version 10.4.0, 2011-12, the content of which is hereby incorporated by reference in its entirety.

One skilled in the art will appreciate that the term mobile device used herein may refer to a mobile station, user equipment (in an E-UTRA system), or any other mobile wireless device capable of communicating with a wireless network. A network component, as referred to herein, includes an access node. The term access node may refer to a base station (BS), a base node, an evolved base node (eNB), a relay node, or other comparable wireless network radio receiver/transmitter components. In an LTE/E-UTRA or an LTE-A/E-UTRA system, an access node may be an eNB or a relay node. For simplicity, both LTE/E-UTRA and LTE-A/E-UTRA systems may be referred to herein as LTE systems. The terms mobile device, network component and access node are meant generically and do not limit embodiments to any particular wireless system or specification.

The methods and apparatuses according to some aspects of the disclosure may reduce the likelihood and frequency of false detection of control information.

As mentioned above, a mobile device may use blind decoding to obtain control information messages (Cis) (such as Downlink Control Information messages (DCIs) in an LTE system) transmitted over a control channel. For the purpose of this description, "blind decoding" refers to attempts to decode something (e.g. control information), which may or may not be present. A possible CI that passes the CRC check may or may not, in reality, be an actual valid CI (i.e. the CI may not have actually been transmitted, or may have been intended for another mobile device). A possible CI that passes the CRC check but is not, in fact, a valid CI is referred to herein as a CI false detection. Due to wireless channel impairment and noise, there may be two different kinds of CI false detection:

1) No CI is transmitted, but a mobile device falsely detects one; and
2) A CI is transmitted for a first mobile device, but a second mobile device falsely detects the CI as being intended for itself.

In the case of an LTE system where the CI is a DCI, for case (1) above, the probability of false detection in the worse case is approximately $1/(2^L)*A$, where L is the number of CRC bits appended to the DCI and A is the maximum number of attempts that a blind decoder may make. If L=16 and A=44, then the false detection rate is approximately =0.067% per subframe per mobile device for one type of RNTI. If there are 10 subframes per frame, the chance (per frame, per mobile device, for type of one RNTI) of false detection will be approximately $1-(1-0.067\%)^{10}=0.67\%$. In this example, if approximately one frame is transmitted every 10 milliseconds, there would be an average of 0.67 errors per second.

There are different types of RNTIs that may be attached to DCIs for different purposes. For example, it is possible that DCI format 1A can attach C-RNTI for user data communication, or attach SI-RNTI for system information. Some examples of different types of RNTIs include: Random Access RNTI (RA-RNTI; Cell RNTI (C-RNTI); Semi-Persistent Scheduling C-RNTI (SPS-RNTI); System Information RNTI (SI-RNTI); Paging RNTI (P-RNTI); Transmit Power Control-Physical Uplink Control Channel-RNTI (TPC-PUCCH-RNTI); and Transmit Power Control-Physical Uplink Shared Channel-RNTI (TPC-PUSCH-RNTI).

For case (2) above, the probability of CI false detection depends on channel condition and noise, but in the worst case it may be close to 0.67% per frame per mobile device for one RNTI.

Another possible detection problem is missed detection, in which a CI is transmitted is to a mobile device, but the mobile device does not detect it. In this case, the error rate may depend on the blind decoding algorithm (usually optimal 2-stage Wrap-Around Viterbi Algorithm (WAVA), which is used for decoding tail-biting convolution code). CI missed detection may be overcome by Acknowledgment (ACK)/Negative Acknowledgement (NACK) feedback to the Base Station (BS), whereas false detection cases (1) and (2) above may be more harmful. For example, if DCI such as DCI 0 (Physical Uplink Shared Channel (PUSCH) grants) or DCI 3/3A (Transmit Power Control) is falsely detected, unintended interferences may be created within a cell, and the overall cell throughput performance may be lowered. As another example, if DCI with RA-RNTI transmission format is mistakenly detected during the download of data with C-RNTI transmission format, the DCI with RA-RNTI will override the DCI with C-RNTI. Again, the overall cell throughput will be decreased.

Depending on the Medium Access Control (MAC) layer or physical control layer, each mobile device could have DCIs scrambled with C-RNTI and SPS-RNTI in the mobile device-specify search space and DCIs scrambled with C-RNTI, RA-RNTI, SPS-RNTI, TPC-PUCCH-RNTI, TPC-PUSCH-RNTI, P-RNTI, and SI-RNTI in the common search space. The probability of the overall false detection may be approximately 2.1% per frame, per mobile device, in the worst case scenario, based on simulations.

FIG. 1 is a flowchart of an example method for reducing CI false detection. The method shown in FIG. 1 may be performed in an apparatus in a mobile device, for example. In this example, the CI may be a DCI in an LTE system. However, the method shown in FIG. 1 may also be used in non-LTE systems. For example, control information for Global System Mobile Communications (GSM) systems may also be processed in accordance with the methods described herein.

At block 182, blind decoding is performed upon buffer data for a candidate control channel to produce decoded data. In some embodiments, the decoded data is a possible CI. It is referred to as "possible CI" because at this stage the output may or may not, in fact, be a valid CI for a given candidate control channel. In some embodiments, the candidate control channel is a PDCCH. The buffer data may, for example, be stored in a buffer such as a PDCCH buffer. The buffer may include a plurality of CCE search spaces.

For each possible CI decoded during the blind decoding process, the following information may also be obtained from decoding the buffer data: a detected CI RNTI; a CI aggregation level; a detected CI payload; and a detected CCE starting address (for the buffer). As noted above, any received transmission will likely include some errors due to signal degradation during transmission (for example, from channel conditions). As part of the decoding process, error correction may be performed. Error correction is an attempt to correct errors that will likely be in the received transmission.

At block 184, the decoded data is encoded to generate re-encoded data. In some embodiments, the decoded data (which may include a CI) is encoded using the same process that would be used at a network component (such as a base station) to encode the CI for transmission to the mobile device on the corresponding candidate control channel. Therefore, if the decoded data includes a valid CI, then the re-encoded data should not contain any errors. In particular, if the decoded data includes a valid CI, the resulting re-encoded data will include bits that would have been expected to be received on the candidate control channel had no errors had been introduced during transmission.

Figure 2:
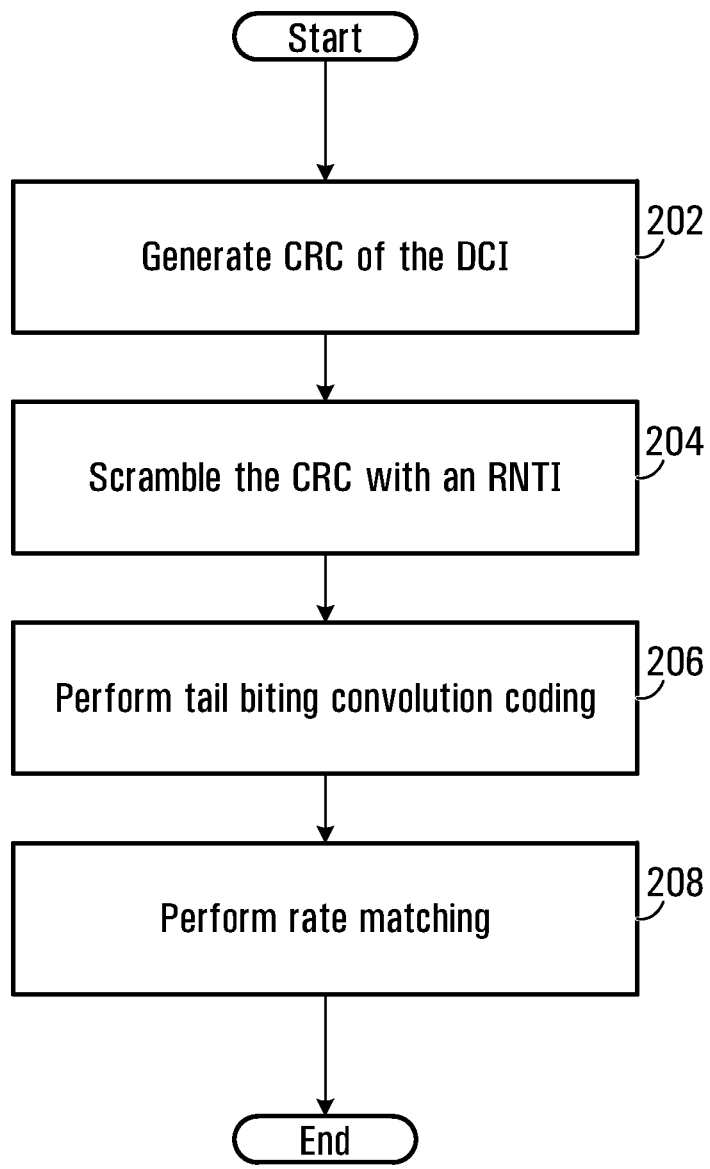
FIG. 2 shows a flowchart of an example method of re-encoding decoded data according to some embodiments.

Turning briefly now to FIG. 2, FIG. 2 shows a flowchart of an example method of re-encoding the decoded data in accordance with some embodiments. In the example of FIG. 2, an LTE system is assumed in which the decoded data includes a possible DCI.

At block 202, CRC bits of the DCI payload are generated

At block 204, the CRC bits are scrambled with the possible DCI RNTI and appended to the possible DCI. A transmit antenna selection indicator may be set by software for re-encoding the possible DCI. If a mobile device transmit antenna selection is configured and applicable, then 3GPP TS 36.212 Table 5.3.3.2-1 may be needed to re-encode the DCI format 0. Embedded control software will typically know if antenna selection is configured. If configured, control software may inform the DCI false detection unit to also include 3GPP TS 36.212 Table 5.3.3.2-1 during re-encoding processes. For example, in case of DCI format 0 and an antenna selection indicator that is valid, the CRC is then scrambled with the antenna selection mask given in 3GPP TS 36.212 Table 5.3.3.2-1.

At block 206, tail biting convolution coding (TB-CC) is performed on the possible DCI, with the scrambled CRC bits appended, according to 3GPP TS 36.212 at Section 5.1.3.1.

At block 208, rate matching is performed with a PDCCH aggregation level that was detected, according to 3GPP TS 36.212 at Section 5.1.4.2.

The method shown in FIG. 2 may be the same or similar encoding steps that would have been performed at the network component (such as a base station or base node) to encode the possible DCI that has been detected, assuming that the detection was valid. One skilled in the art will understand that the method of re-encoding the possible DCI shown in FIG. 2 is only an example of how possible DCI may be re-encoded, and embodiments are not limited to this method. More generally, any method that may be used to encode control information may be used in some embodiments.

Turning back to FIG. 1, at block 186, the re-encoded data is compared with the buffer data for the candidate control channel. For example, in some embodiments, the buffer data is compared starting at the detected CCE start address and for the detected aggregation level. In some embodiments, comparing the re-encoded data with the buffer data for the candidate control channel includes determining a metric as a function of a degree of similarity between the re-encoded data and the buffer data. Generally speaking, if the decoded data includes a valid CI (i.e. the CI was actually transmitted to the mobile station on the candidate control channel), the only expected difference between the re-encoded data and the buffer data should be any bit-errors that are present in the buffer data. The bit-errors in the buffer data would have been introduced during transmission of the data to the mobile device. However, if the CI detection is false, there may be a greater difference between the buffer data and the re-encoded data. For example, a great deal of error correction may have been performed on the buffer data at the mobile device in order to produce the falsely detected CI. In that case, encoding the falsely detected CI may produce re-encoded data that is has many differences from the buffer data.

The buffer data may be generated from a received transmission by either hard decision decoding or soft decision decoding. Thus, the buffer data may include either hard bits or soft bits. Soft bits differ from hard bits in that each soft bit includes extra information describing the reliability or certainty that the bit is correct. "Distances" may be calculated from the soft bit reliability or certainty information. The term "Distance" is used to denote the likelihood or certainty of the transmitted information. For example, if −127 is used to represent a certain 0 transmitted and 127 is used to represent a certain 1 transmitted. If a soft bit 100 is received, then the likelihood measure "distance" is 27 to certain 1 and "distance" 227 to certain 0. In embodiments where the buffer data includes soft bits, the metric determined by the comparison may be an average accumulated distance between the soft bits of the buffer data and bits of the re-encoded data. The bits of the re-encoded data may be scaled bits. In this disclosure, the term "scaled bits" simply refers to bits that have been put in the proper format for soft bits. In particular, the "scaled" bits of the re-encoded CI may include information that denotes the bits as certain 0's or certain 1's. In embodiments where the buffer data includes hard bits, comparing the re-encoded data with the buffer data may include performing a bit-by-bit comparison of the hard bits of the buffer data and the re-encoded data. In this case, the metric (generated by the comparison) may, for example, be a Bit Error Rate (BER).

At block 188, the decoded data is treated as control information dependent on the comparison of the re-encoded data with the buffer data. In some embodiments, treating the decoded data as control information dependent on the comparison includes comparing the metric to a threshold. For example, in embodiments where the buffer data includes soft bits, the threshold may be a particular average accumulated distance threshold value. In embodiments where the buffer data includes hard bits, the threshold may be a particular BER threshold value.

In some embodiments, treating the decoded data as control information dependent on the comparison includes treating the decoded data as valid control information or as false control information as a function of the comparison. Treating the decoded data as valid control information may include parsing the decoded data or passing the decoded data to a CI parser unit. A CI parser unit may simply be referred to as a parser unit herein. In some embodiments, treating the decoded data as false control information includes not parsing the decoded data or not passing the decoded data to a CI parser unit. For example, the decoded data may simply be discarded.

Figure 3:
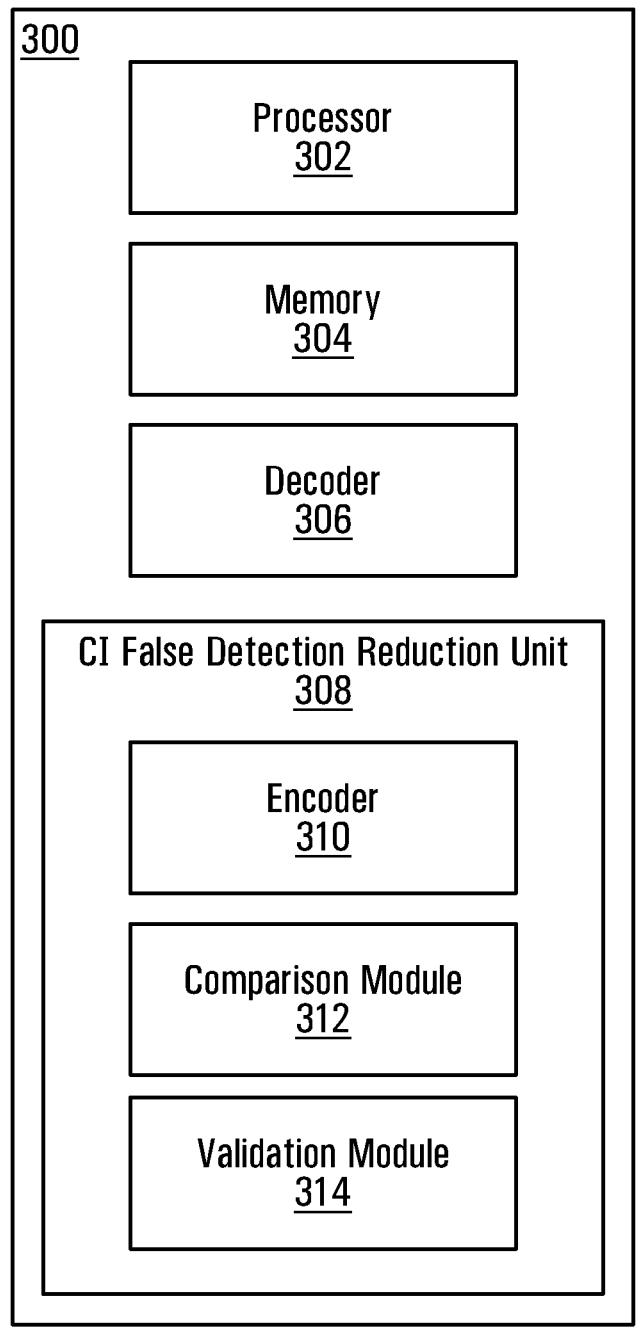
FIG. 3 is a block diagram of an example apparatus that may implement the method of FIG. 1.

FIG. 3 is a block diagram of an example apparatus 300 that may implement the method of FIG. 1. The apparatus 300 may be part of a mobile device. The apparatus 300 includes a processor 302, a memory 304, a decoder 306, and a CI false detection reduction unit 308. The CI false detection reduction unit 308 includes an encoder 310, a comparison module 312, and a validation module 314. The decoder 306 performs blind decoding upon buffer data for a candidate control channel to produce decoded data. In some embodiments, the decoded data is a possible CI. The decoded data may be a possible DCI decoded from PDCCH buffer data in an LTE system. False detection reduction module 308 performs a check of the decoded data to determine whether the decoded data should be treated as control information. Specifically, the encoder 310 of the CI false detection reduction module 308 encodes the decoded data to generate re-encoded data. The comparison module 312 compares the re-encoded data with the buffer data for the candidate control channel. Finally, the validation module 314 treats the decoded data as control information dependent on the comparison of the re-encoded data with the buffer data. In some embodiments, treating the decoded data as control information dependent on the comparison includes treating the decoded data as either valid control data or false data dependent on the comparison. For example, treating the possible decoded data as valid control information may include passing the decoded data to a parser unit. In some embodiments, the apparatus 300 further includes the parser unit.

The CI decoder 306 and/or the CI false detection reduction unit 308 may be implemented as a processor (such as the processor 302) configured to perform the functions described above. The CI decoder 306 and/or the CI false detection reduction unit 308 may be implemented as a memory (such as the memory 304) containing instructions for execution by a processor (such as the processor 302), by hardware, or by a combination of instructions stored in a memory and additional hardware, to name a few examples.

The examples shown in FIGS. 4 to 8 and discussed below are examples of embodiments in LTE systems, where DCIs are transmitted as control information. However, embodiments are not limited to LTE type DCIs only.

Figure 4:
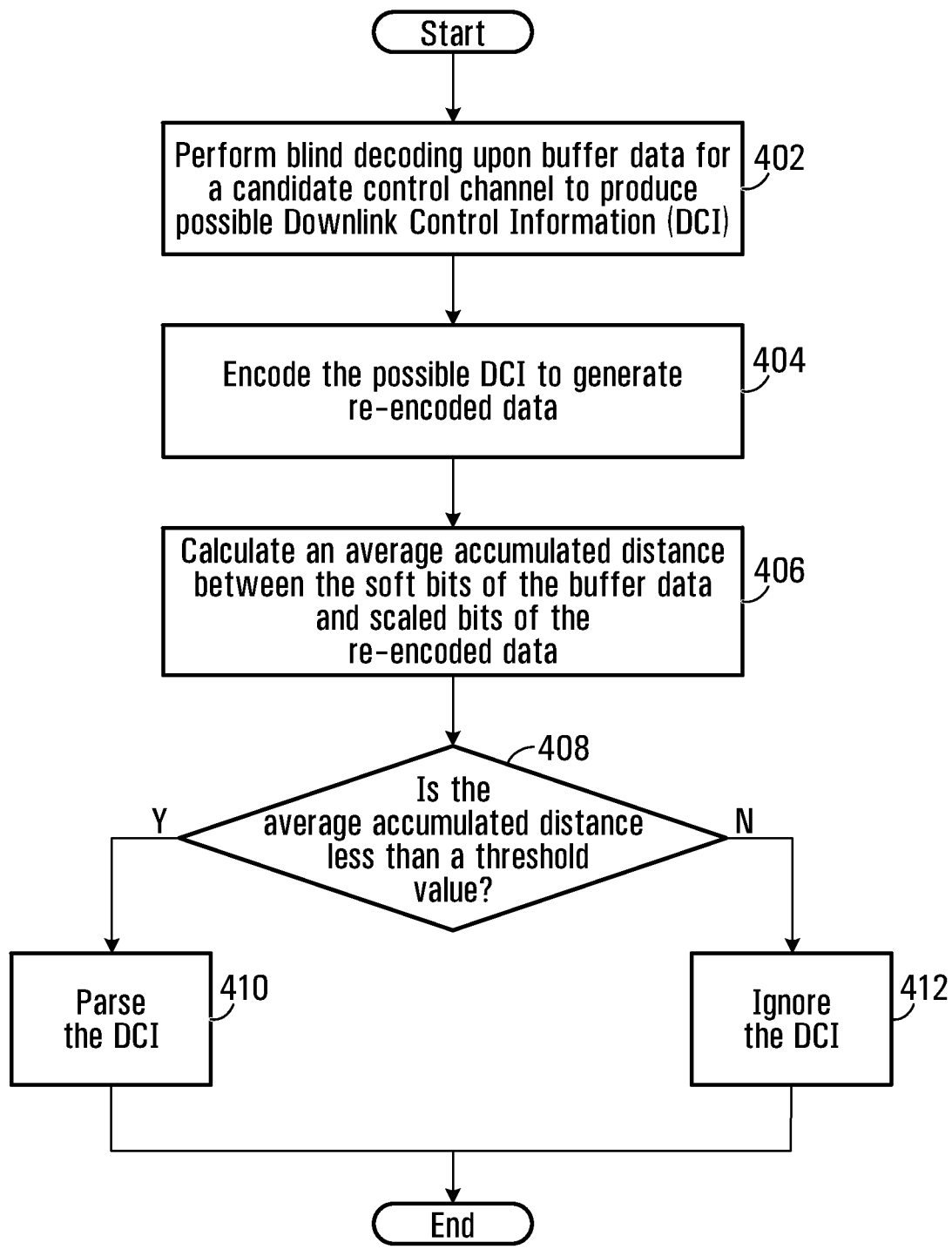
FIG. 4 is a flowchart of another example method for reducing false detection of control information according to some embodiments, in which buffer data includes soft bits.

FIG. 4 is a flowchart of another example method for reducing false DCI detection, in which the buffer data includes soft bits generated by soft decision decoding. At block 402, blind decoding is performed upon buffer data for a candidate control channel to produce decoded data. In this example embodiment, the decoded data includes at least one possible DCI. The buffer data may be decoded as described above with respect to block 182 of FIG. 1. At block 404, the possible DCI is encoded to generate re-encoded data. The possible DCI may be encoded as described above with respect to block 184 of FIG. 1.

At block 406, the buffer data is compared to the re-encoded data to calculate an average accumulated distance between the soft bits of the buffer data and scaled bits of the re-encoded data. At block 408, the average accumulated distance is compared to a threshold. The threshold, in this embodiment, is a threshold average accumulated distance threshold value. If the calculated average accumulated distance is less than the threshold (yes path of block 408), then the DCI is parsed at block 410. If not (no path of block 408), the DCI is ignored and/or discarded at block 412.

Figure 5:
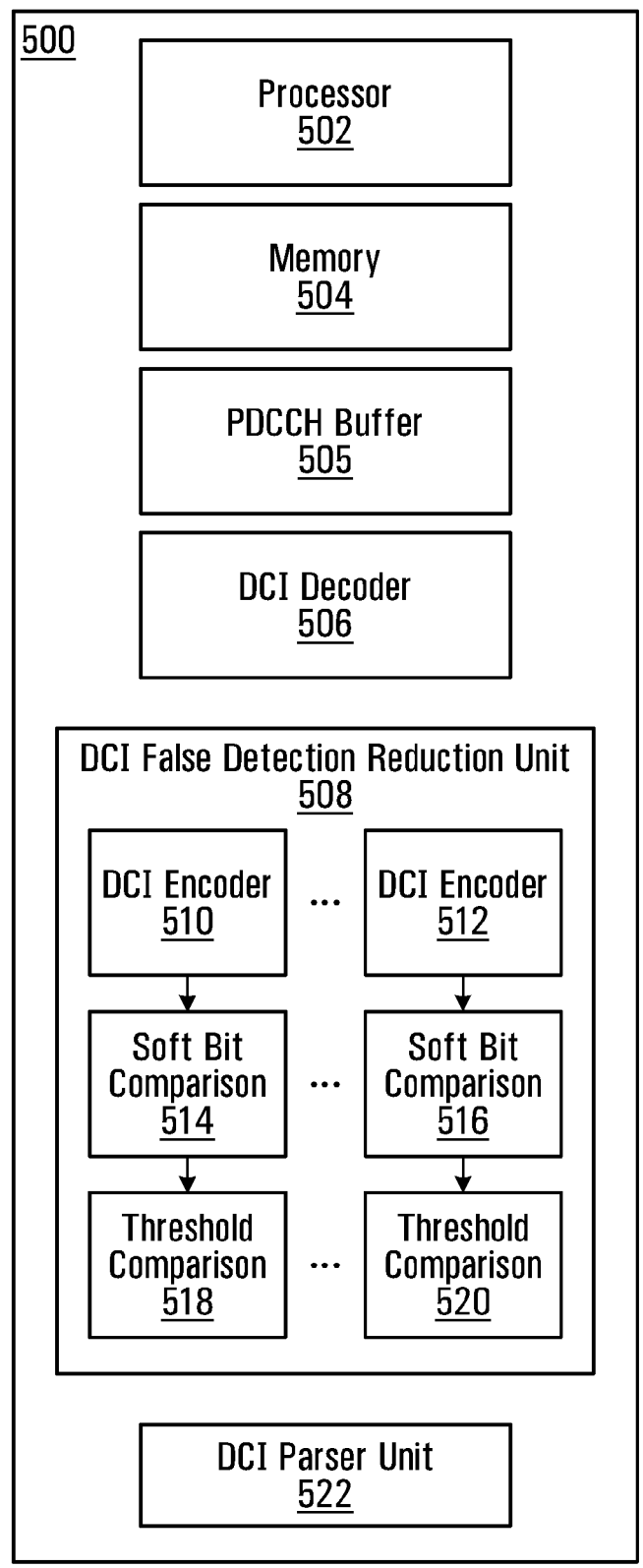
FIG. 5 is a block diagram of an example apparatus that may implement the method of FIG. 4.

FIG. 5 is a block diagram of an example apparatus 500 that may implement the method of FIG. 4. The apparatus 500 may be part of a mobile device. The apparatus 500 includes a processor 502, a memory 504, a PDCCH buffer 505, a DCI decoder 506, and a DCI false detection reduction unit 508. The DCI false detection reduction unit 508 includes a plurality of DCI encoders (510, . . . , 512) and a plurality of soft bit comparison modules (514, . . . , 516), where each DCI encoder (510, . . . , 512) is connected to a respective one of the soft bit comparison modules (514, . . . , 516). The DCI false detection reduction unit 508 also includes a plurality of threshold comparison modules (518, . . . , 520), one for each of the soft bit comparison modules (514, . . . , 516). In other words, each soft bit comparison module (514, . . . , 516) corresponds to a respective one of the DCI encoders (510, . . . , 512) and each of the threshold comparison modules (518, . . . , 520) corresponds to a respective one of the soft bit comparison modules (514, . . . , 516). The apparatus 500, in this embodiment, also includes a DCI parser unit 522.

The processor 502, the memory 504 and the DCI decoder 506 in this embodiment are similar to the processor 302, the memory 304 and the DCI decoder 306 shown in FIG. 3. The buffer data, in this embodiment, includes respective buffer data for each of a plurality of candidate control channels. In this embodiment, the DCI decoder 506 can produce, as output, all possible DCIs that have been decoded from buffer data of the PDCCH buffer 505 (for the plurality of candidate control channels) and have passed a CRC check. In this example, the possible DCIs are a plurality of decoded data messages that are passed to the encoders (510, . . . , 512). Decoded data messages are not limited to possible DCIs and may be other possible CIs in other embodiments. Typically, the number of possible DCIs that will pass the CRC check and be passed to the DCI false detection reduction unit 508 is much less than the number of blind decoding attempts. In this example, it is assumed that a respective possible DCI is passed to each of the encoders (510, . . . , 512), although one or more of the encoders (510, . . . , 512) may not always receive a possible DCI, as will be explained below.

In this example, each DCI encoder (510, . . . , 512) encodes one of the possible DCIs received from the DCI decoder 506 to generate respective re-encoded data. Each soft bit comparison module (514, . . . , 516) may be similar to the comparison module 312 shown in FIG. 3. Each of the soft bit comparison modules (514, . . . , 516), in this embodiment, calculates the average accumulated distance between the soft bits of the buffer data and scaled bits of the respective re-encoded data received from the respective DCI encoder (510, . . . , 512). In this example, for each soft bit comparison module (514, . . . , 516), the respective buffer data compared to the respective re-encoded data will be the same buffer data that was decoded by the DCI decoder 506 to produce the possible DCI. As discussed above, a blind decoder may obtain the CCE start address (of the buffer) and the aggregation level of the candidate PDCCH. Using this information, the correct buffer data can be obtained from the PDCCH buffer for by the soft bit comparison modules (514, . . . , 516) to use in the comparison. Each soft bit comparison module (514, . . . , 516) calculates an average accumulated distance between the soft bits of the PDCCH buffer and scaled bits of the respective re-encoded data. Each comparison module (514, . . . , 516) passes the respective calculated average accumulated distance to the respective threshold comparison module (518, . . . , 520). The threshold comparison modules (518, . . . , 520) are validation modules that each may be similar to the validation module 314 shown in FIG. 3. Each threshold comparison module (518, . . . , 520) compares the respective calculated average accumulated distance to a threshold value. The threshold value may be pre-set in the apparatus 500. In some embodiments, the threshold value may be adjusted dynamically as deemed necessary or desirable.

For each threshold comparison module (518, . . . , 520), if the respective calculated average accumulated distance between the soft bits of the buffer data and the scaled bits is less than the threshold, the respective possible DCI is passed to the parser unit 522. In some embodiments, only the DCI payload and the RNTI are passed to the DCI parser unit 522. Otherwise, if the calculated average accumulated distance between the soft bits of the buffer data and scaled bits is equal to or more than the threshold, the possible DCI is ignored or discarded and is not passed to the parser unit 522.

The DCI decoder 506, the DCI false detection reduction unit 508 and/or the parser unit 522 may be implemented as a processor (such as the processor 502) configured to perform the functions described above. The DCI decoder 506 and/or the DCI false detection reduction unit 508 may be implemented as a memory (such as the memory 504) containing instructions for execution by a processor (such as the processor 502), by hardware, or by a combination of instructions stored in a memory and additional hardware, to name a few examples.

As can be seen in FIG. 5, each DCI encoder (510, . . . , 512) is connected to one respective soft bit comparison module (514, . . . , 516), which is connected to one respective and threshold comparison module (518, . . . , 520). Therefore, multiple parallel sets of these modules are formed where each set can process one possible DCI. One skilled in the art will understand that there may be more or fewer DCI encoders (510, . . . , 512), soft bit comparison modules (514, . . . , 516), or threshold comparison modules (518, . . . , 520) than are shown in FIG. 5. In some embodiments, some or all of the DCI encoders (510, . . . , 512), soft bit comparison modules (514, . . . , 516), and threshold comparison modules (518, . . . , 520) do not operate on a possible DCI when the total number of possible DCIs output by the DCI decoder 506 is less than the number of parallel sets of DCI encoders (510, . . . , 512), soft bit comparison modules (514, . . . , 516), and threshold comparison modules (518, . . . , 520). Conventional LTE system hardware may, as an example, support a maximum of seven DCIs per subframe. In such systems, as an example, 14 parallel sets of these modules may be present to ensure that all possible DCIs can be processed in parallel. However, embodiments are not limited to any particular number of parallel DCI encoders (510, . . . , 512), soft bit comparison modules (514, . . . , 516), and threshold comparison modules (518, . . . , 520). If there are more possible DCIs to process than the number of encoder (510, . . . , 512), soft bit comparison module (514, . . . , 516), and threshold comparison module (518, . . . , 520) pairs a first group of possible DCIs can be processed, with remaining possible DCIs being processed after.

In some embodiments, information in addition to the decoded data (that is treated as valid CI) may be sent to a parser unit (such as the parser unit 522 shown in FIG. 5). For example, the metric that is determined as a function of a degree of similarity between the re-encoded data and the buffer data may be passed on to the parser unit. For example, the metric may be passed from the validation module 314 shown in FIG. 3, one or more of the threshold comparison modules (518, . . . , 520) and (718, . . . , 720) shown in FIGS. 5 and 7, or one or more of the validation modules 842 shown in FIG. 8. Embodiments are not limited to any particular component passing the metric to the parser unit. If multiple possible CIs are processed (as in the embodiments shown in FIGS. 4 to 8), the metrics determined for each possible CI may be passed to the parser unit. For example, with respect to FIG. 5, for each DCI that is passed to the parser unit 522, the respective calculated average accumulated distance between the soft bits of the PDCCH buffer and scaled bits of the re-encoded data may be also be passed to the parser unit 522.

Optionally, the metrics may be used by the parser unit in the CI parsing process, although embodiments are not limited to either providing the metrics to the parser unit or to any particular use of the metrics by the parser unit. In some embodiments, the parser unit may use the metric for two or more CIs to resolve potential conflicts. Two CIs may be considered to conflict with one another if, for example, the two CIs have the same RNTI type and function, or if one of the two CIs would normally override the other CI when both are received. It may be that only one of the conflicting CIs is valid and the conflict is a result of a false CI detection. If two or more conflicting CIs are passed to the parser unit, the parser unit may compare the respective metrics for the CIs to determine which CI is the most likely to be valid. As a more specific example, in some embodiments, if two or more of the plurality of possible CIs are passed to the parser unit, and the two or more possible CIs include conflicting control information, the parser unit parses only one of the two or more possible CIs as a function of the respective metrics for the two or more possible CIs. As a more specific example, if the metrics are each an average accumulated distance, as discussed above with reference to FIGS. 4 and 5, then the parser unit may only parse the DCI having the lowest average accumulated distance. A lower average accumulated distance may indicate that the DCI is more likely correct than the other conflicting DCIs. The one or more conflicting CIs with a worse metric may be discarded.

Figure 6:
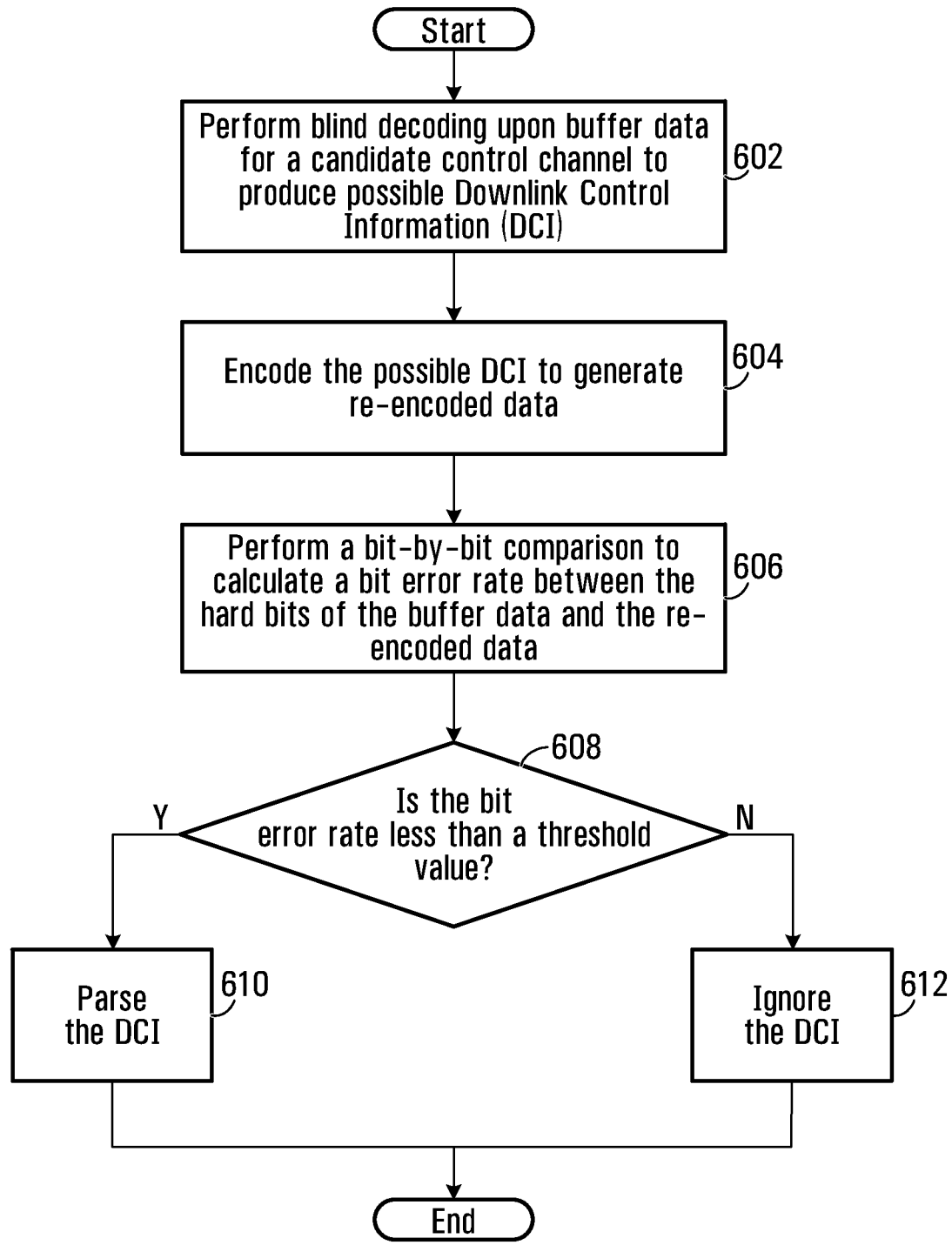
FIG. 6 is a flowchart of another example method for reducing false detection of control information according to some embodiments, in which buffer data includes hard bits.

FIG. 6 is a flowchart of another example method for reducing false DCI detection, in which the buffer data includes hard bits generated by hard decision decoding. At block 602, blind decoding is performed upon buffer data for a candidate control channel to produce decoded data. In this example embodiment, the decoded data includes at least one possible DCI. The buffer data may be decoded as described above with respect to block 182 of FIG. 1. At block 604, the possible DCI is encoded to generate re-encoded data. The possible DCI may be encoded as described above with respect to block 184 of FIG. 1 and/or with respect to FIG. 2.

At block 606, the buffer data is compared bit-by-bit to the re-encoded data to calculate a BER. One skilled in the art will appreciate that a different metric may be calculated as a function of a bit-by-bit comparison to determine a degree of similarity between the buffer data and the re-encoded data. For example, in some embodiments, a total number of bit errors is calculated rather than a bit error rate. More generally, any suitable method of comparing two sets of bits and calculating a metric based on the comparison may be used. At block 608, the BER is compared to a threshold. The threshold, in this embodiment, is a threshold BER value. If the calculated BER is less than the threshold (yes path of block 608), then the DCI is parsed at block 610. If not (no path of block 608), the DCI is ignored and/or discarded at block 612.

Figure 7:
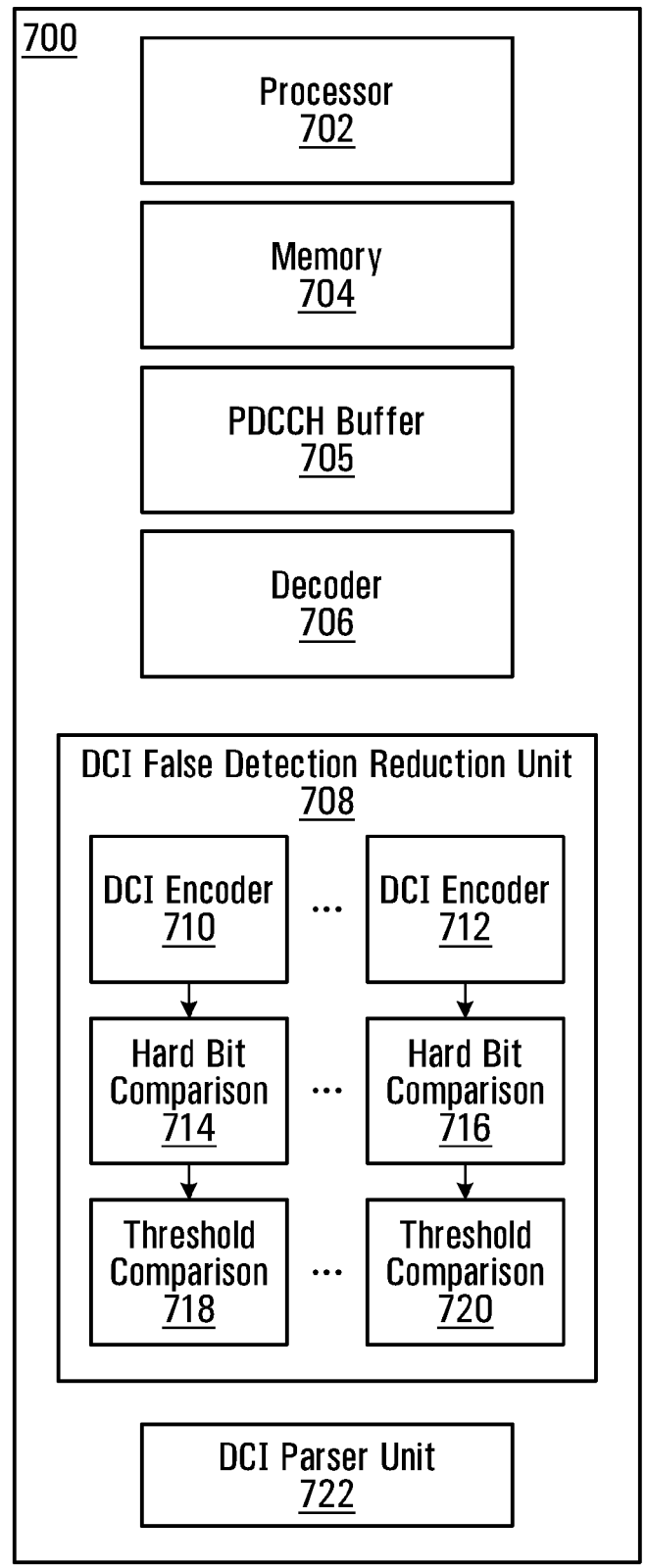
FIG. 7 is a block diagram of an example apparatus that may implement the method of FIG. 6.

FIG. 7 is a block diagram of an example apparatus 700 that may implement the method of FIG. 6. The apparatus 700 may be part of a mobile device. The apparatus 700 includes a processor 702, a memory 704, a PDCCH buffer 705, a DCI decoder 706, and a DCI false detection reduction unit 708. The DCI false detection reduction unit 708 includes a plurality of DCI encoders (710, ..., 712) and a plurality of hard bit comparison modules (714, ..., 716) where each DCI encoder (710, ..., 712) is connected to a respective one of the hard bit comparison modules (714, ..., 716). The DCI false detection reduction unit 708 also includes a plurality of threshold comparison modules (718, ..., 720), one for each of the hard bit comparison modules (714, ..., 716). The specific number of DCI encoders (710, ..., 712), hard bit comparison modules (714, ..., 716), and threshold comparison modules (718, ..., 720) may vary. In other words, each hard bit comparison module (714, ..., 716) corresponds to a respective one of the DCI encoders (710, ..., 712) and each of the threshold comparison modules (718, ..., 720) corresponds to a respective one of the hard bit comparison modules (714, ..., 716). The apparatus 700, in this embodiment, also includes a DCI parser unit 722.

The processor 702, the memory 704 and the DCI decoder 706 in this embodiment are similar to the processor 502, the memory 504 and the DCI decoder 506 shown in FIG. 5. In this embodiment, the DCI decoder 706 can produce, as output, all possible DCIs that have been decoded from buffer data of the PDCCH buffer 705 (for a plurality of candidate control channels) and have passed a CRC check. In this example, the possible DCIs are a plurality of decoded data messages that are passed to the encoders (710, ..., 712). The buffer data, in this embodiment, includes respective buffer data for each of the plurality of candidate control channels. The DCI encoders (710, ..., 712) of the DCI false detection reduction unit 708 is similar to DCI encoders (510, ..., 512) of the DCI false detection reduction unit 508 shown in FIG. 5. Each hard bit comparison module (714, ..., 716) may be similar to the comparison module 312 shown in FIG. 3. The hard bit comparison modules (714, ..., 716) each perform a bit by bit comparison of the hard bits of the respective buffer data with the bits of re-encoded data received from the respective DCI encoders (710, ..., 712) to calculate a bit error rate, where the bit error rate is indicative of the number of differences between the buffer data and the re-encoded data. The threshold comparison modules (718, ..., 720) are validation modules and may each be similar to the validation module 314 shown in FIG. 3. Each threshold comparison module (718, ..., 720) compares the respective calculated bit error rate to a threshold (a threshold bit error rate value in this case). If the calculated bit error rate is below the threshold, then the threshold comparison module (718, ..., 720) passes the DCI to be parsed at the parser unit 722. In some embodiments, only the DCI payload and the RNTI is passed to the DCI parser unit 722. If the calculated bit error rate is equal to or greater than the threshold, the DCI is ignored and/or discarded.

One skilled in the art will understand that there may be more or fewer DCI encoders (710, ..., 712), hard bit comparison modules (714, ..., 716), or threshold comparison modules (718, ..., 720) than are shown in FIG. 7. In some embodiments, some or all of the DCI encoders (710, ..., 712), hard bit comparison modules (714, ..., 716), and threshold comparison modules (718, ..., 720) do not operate on a possible DCI when the total number of possible Das output by the DCI decoder 706 is less than the number of parallel sets of DCI encoders (710, ..., 712), hard bit comparison modules (714, ..., 716), and threshold comparison modules (718, ..., 720).

As discussed above, the metric that is determined for each possible DCI may be passed to a parser unit, such as the parser unit 722 shown in FIG. 7. In this example, the metric for each possible DCI is a respective BER as described with reference to FIGS. 6 and 7. The BERs for one or more of the possible DCIs may be passed to the parser unit 722 shown in FIG. 7. The BERs may optionally be used by the parser unit 722 in the DCI parsing process. For example, in some embodiments, the parser unit 722 uses the BERs for two or more conflicting DCIs (that have each passed the DCI false detection reduction unit 708) to resolve which DCI should be treated as valid and which conflicting one or more DCIs should be discarded.

The thresholds described with reference to the examples shown in FIGS. 4 to 7 are set values. However, embodiments are not limited to a single threshold value. For example, in other embodiments the threshold is a range of values. The threshold may also be adjusted over time.

Figure 8:
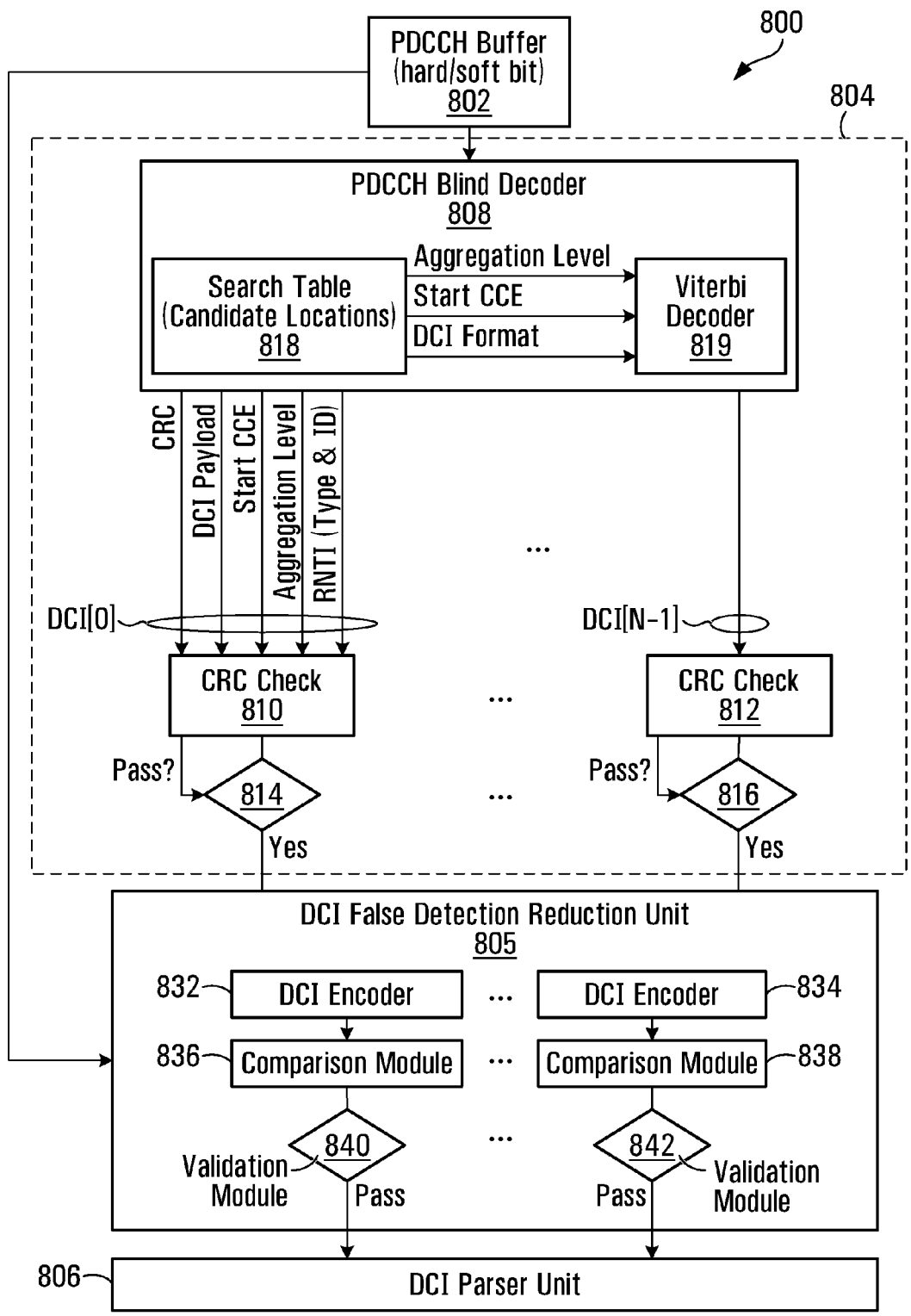
FIG. 8 is a block diagram of another example apparatus for reducing false detection of control information according to some embodiments.

FIG. 8 is a block diagram of an example apparatus 800 for reducing false DCI detection. The example in FIG. 8 shows additional details regarding how possible DCIs may be decoded in an LTE system. The control channel in this example is an LTE PDCCH. The apparatus 800 includes a PDCCH buffer 802, a DCI decoder 804, a DCI false detection unit 805, and a DCI parser unit 806. The PDCCH Buffer 802 includes buffer data for all of the Control Channel Elements (CCEs) in the PDCCH search space. The buffer data may be soft bits generated by a soft decision decoding method or hard bits generated by a hard decision decoding method. The DCI decoder 804, in this example, is indicated with a stippled line that encloses various components of the decoder. In particular, the DCI decoder 804 includes a PDCCH blind decoder 808, and a plurality of CRC check modules (810, ..., 812). For each CRC check module (810, ..., 812), the apparatus 800 includes a respective decision block (shown collectively as blocks (814, ..., 816)).

The DCI decoder 804 performs blind decoding upon buffer data from the PDCCH buffer 802 to generate possible DCIs. First, the PDCCH blind decoder 808 of the DCI decoder 804 blindly decodes the buffer data. The PDCCH blind decoder, in this example, includes a search table 818 and a Viterbi decoder 819. The search table 818 includes definitions of the candidate DCI search spaces including the respective aggregation levels, start CCE address and DCI formats for each of the possible candidate DCIs. Based on the information contained in the search table 818, the Viterbi Decoder 819 makes multiple attempts to decode the buffer data contained in the PDCCH buffer 802. For a given candidate DCI in the search table, the buffer data may be decoded into the following information (as shown in FIG. 8): a RNTI indicating a type of the RNTI and an identification of the mobile device for which the DCI is intended; the aggregation level; the start CCE address for the PDCCH; the DCI payload; and the CRC. For each of the candidate DCIs decoded by the PDCCH blind decoder 808, this information is passed to the respective CRC check module (810, ..., 812) which checks the decoded CRC bits with the RNTI to determine whether the detection is valid. In this example, the PDCCH blind decoder 808 can make a maximum of N blind decoding attempts, where each attempt is for a different possible candidate DCI location and DCI format combination (where N is typically 44 in an LTE system). Each attempt will produce a respective one of the possible DCIs (shown as DCI[0], ..., DCI[N–1] in FIG. 8). Each possible DCI that passes the CRC check is passed to the DCI false detection unit 805. In a typical system, most of the blind decoding attempts may not produce a possible DCI that passes the CRC check.

In the example apparatus 800 shown in FIG. 8, the multiple possible DCIs produced by the PDCCH blind decoder 808 (one possible DCI for each blind decoding attempt) are passed to CRC check modules (810, ..., 812), and processed by the CRC check modules (810, ..., 812), in parallel. However, embodiments are not limited to this arrangement. For example, fewer CRC check modules may be used and some possible DCIs may be checked in series by the CRC check modules rather than in parallel. The DCIs that pass the CRC check may be referred to as decoded data messages.

The DCI false detection unit 805 includes a plurality of DCI encoders (832, ..., 834), a plurality of comparison modules (836, ..., 838), and a plurality of validation modules (840, ..., 842). Each DCI encoder (832, ..., 834) may receive a respective possible DCI from the DCI decoder 804. Each DCI encoder (832, ..., 834), when a respective possible DCI is received as input, re-encodes the possible DCI to generate respective re-encoded data and passes the re-encoded data to a respective comparison module (836, ..., 838), which in turn compares the re-encoded data to buffer data from the PDCCH Buffer. The buffer data compared to a given possible DCI is the buffer data that was originally decoded to produce the given possible DCI. The validation modules (840, ..., 842) treat possible DCIs as valid or false as a function of the comparison. Valid DCIs, in this example, are passed to the DCI parser unit 806. In some embodiments, only the DCI payload and the RNTI is passed to the DCI parser unit 806. False DCIs are ignored or discarded. The DCI false detection reduction unit 805 in this example may be similar to the DCI false detection reduction units 308, 508 or 708 shown in FIGS. 3, 5 and 7 respectively.

The methods and apparatus for reducing DCI false detection described herein may be implemented using software and/or hardware. For hardware implementation, components of the DCI encoder (such as the DCI encoder 310 shown in FIG. 3 or one or more of the DCI encoders (510, ..., 512), (710, ..., 712), and (832, ..., 834) shown in FIGS. 5, 7 and 8) may also be used in a mobile device for encoding messages to be sent to a network component, such as a base station or base node. For example, components for CRC calculation, TB-CC and rate matching, may already be present in a mobile device for the purpose of uplink transmission. Therefore, the increased hardware complexity to implementing the methods and/or apparatuses described herein in the mobile device may be minimized. For example, some existing components may simply need to be re-configured to make certain function calls to perform portions of the methods described herein.

In some embodiments, an apparatus includes multiple CI false detection reduction modules are used rather than a single CI false detection module (as shown in FIGS. 5, 7 and 8) containing multiple sets of sets of encoders, comparison modules and validation modules.

The methods and apparatuses disclosed herein may help reduce the rate of false DCI detection. In theory, the rate of falsely detecting a DCI that is not transmitted, or is transmitted may be given by the following equation for an LTE system:

$$\text{False Detection Rate} = (\frac{1}{2}^M)*44$$

In the above equation, M is the number of coded bits in the DCI, which is greater than the number of CRC bits. As noted above, the false detection rate, in a conventional system, may be given by $(\frac{1}{2}^L)*44$ where L is the number of CRC bits. Because M>L, the false detection rate may be lower when the methods and/or apparatuses for reducing false detection described herein are implemented.

Table 1 below shows the results of MATLAB™ simulations of false detection reduction using the methods described herein, with the following conditions and/or assumptions: LTE 20 MHz with Control Format Indicator (CFI) 3; soft decision PDCCH buffer and a Signal to Noise Ratio (SNR) of 0 dB; and approximated signed 11-bit quantized log-likelihood ratio (LLR) soft bits. The simulations also assume C-RNTI and SPS-RNTI in the mobile device-specific search space (with aggregation levels 1, 2, 4 and 8), and C-RNTI, RA-RNTI, SPS-RNTI, TPC-PUCCH-RNTI, TPC-PUSCH-RNTI, P-RNTI, and SI-RNTI in the common search space (with aggregation levels 4 and 8). The possible DCI lengths are 44 and 55 for the mobile device-specific search space whereas possible DCI lengths are 44 and 31 for common search space. The simulation results are as shown in Table 1 below:

TABLE 1

| | False Detection percentage per frame | Minimum Distance Error Rate for false detection if no DCI is transmitted (average distance difference/ re-encoded scaled distance) | Maximum Distance Error Rate if only DCI 1A was transmitted (average distance difference/ re-encoded scaled distance) |
| --- | --- | --- | --- |
| Aggregation 1 | 0.1% | 0.4414 | 0.3999 |
| Aggregation 2 | 0.2% | 0.5806 | 0.5476 |
| Aggregation 4 | 1.4% | 0.6560 | 0.5010 |
| Aggregation 8 | 0.4% | 0.7918 | 0.6569 |

In Table 1 above, the minimum distance error rate is defined as the minimum distance measure of all falsely detected DCIs. Note that the minimum distance in Table 1 is chosen to compare how similar the falsely detected DCI is compared with the re-encoded data. The maximum distance error rate is the least likely measure of the detected true DCI compared with the re-encoded data. Take Aggregation 1 as an example, from all the falsely detected DCIs, the one most similar to the re-encoded data has a Minimum Distance Error Rate of 0.4414 (average distance difference/re-encoded scaled distance). On the other hand, when DCI detection is valid (i.e. DCI 1A was transmitted), the Maximum Distance Error Rate (i.e. the error rate for the received DCI that is the least similar to the re-encoded data) is 0.3999. The more similar the received DCI is to the re-encoded data, the less the error rate should be. Therefore, if the DCI false detection reduction method described herein is used and the threshold error rate is set to be 0.42, then there should be no falsely detected DCI in this example.

In an LTE system, since each DCI has certain structure, conventional DCI false detection reduction may be done in the DCI parsing unit (for example, using software) after a blind decoder. The parsing unit may decide if the detected DCI is valid or false. Conventionally, the DCI parsing unit will randomly pick one of the DCI if two or more DCIs with the same RNTI type and mobile device identification are detected. Also, as previously mentioned, if DCI with RA-RNTI is mistakenly detected, the DCI with RA-RNTI may conventionally override the DCI with TC-RNTI, C-RNTI, or SPS-RNTI. However, as described above, in some embodiments, the parser unit may take into account, for each possible DCI, a metric generated as a function of a degree of similarity between the re-encoded DCI and the respective buffer data. For example, the parser unit may thereby decide which DCI(s) to treat as valid based on the metrics determined for the possible DCIs.

The methods and apparatus described herein may refine the accuracy of a blind decoder. Assuming the DCI is valid and the search spaces for different aggregation levels overlap, it is possible that a lower aggregation level DCI could be falsely detected in a higher aggregation level search space due to channel impairment and noise. By comparing the re-encoded result bit by bit, the more accurate aggregation level can be obtained. Normally, a DCI with high aggregation level may be detected correctly with a lower aggregation level.

In some example embodiments, the overall complexity increase to implement the methods and apparatuses described herein may be approximately 3 to 8% of conventional PDCCH decoding complexity. The methods described herein may be used in poor Signal to Noise (SNR) cases, which may further reduce average complexity. For example, based on a comparison of Central Processing Unit (CPU) processing time in MATLAB™ simulations for a 20 MHz, Control Format Indicator (CFI)=3 case, the complexity of WAVA decoding for 44 DCI candidates may be about 30 times of the DCI false detection reduction unit complexity. The CFI determines the size of the PDCCH buffer.

Figure 9:
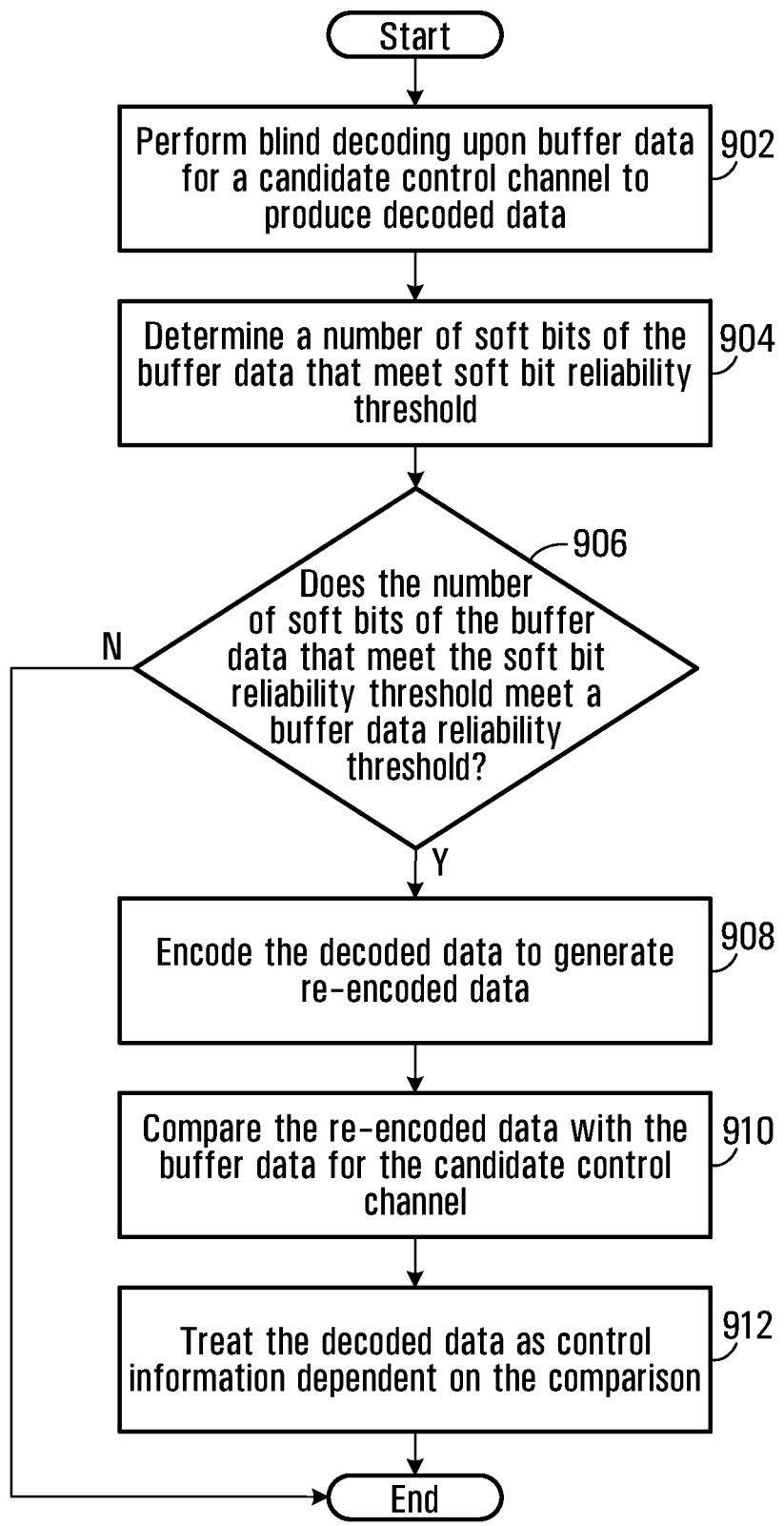
FIG. 9 is a flowchart of another example method for reducing false detection of control information according to some embodiments.

According to some embodiments, a reliability check of the buffer data for the candidate control channel may be performed. For example, the reliability check may be performed as a threshold test before performing blind decoding upon the buffer data to produce decoded data. Buffer data that doesn't meet a minimum threshold of reliability may be more likely to contain a false CI when decoded. Therefore, if the buffer data does not meet the minimum threshold of reliability, in some embodiments, a possible CI that is decoded from the buffer data may be assumed to be false and no further testing to determine whether to treat the possible CI as valid or false is performed in that case. This threshold reliability test may increase efficiency and accuracy of the blind decoding process FIG. 9 is a flow chart of another example method in accordance with some embodiments, in which the buffer data that that is decoded contains soft bits. At block 902, the buffer data for a candidate control channel is blind decoded to generate decoded data. The decoded data may be a possible DCI decoded from PDCCH buffer data in an LTE system. At block 904, a number of the soft bits, of the buffer data for the candidate control channel, that meet a soft bit reliability threshold is determined. As noted above, soft bits differ from hard bits in that they include extra information describing the reliability or certainty of that the bit is correct. As an example, −127 may be used to denote a "certain 0" and +127 may be used to denote a "certain 1". A soft bit value of zero would then denote complete uncertainty. As an example, if a first soft bit has a value of +50 or −50, it has a distance of 50 from the value of zero. If a second soft bit with a value of +30 or −30 has a distance of 30 from the value of zero, then it would be less reliable than the first soft bit. In some embodiments, determining the number of the soft bits of a candidate control channel that meet the soft bit reliability threshold includes, for each soft bit, comparing the soft bit to the reliability threshold. The soft bit reliability threshold may define a minimum distance from the value of zero that a given soft bit must be to be considered sufficiently reliable.

At block 906, it is determined whether said number of soft bits that meet the reliability threshold meets a buffer data reliability threshold. The term "buffer data reliability threshold" is simply used to denote a minimum permissible number of buffer data soft bits for the candidate control channel that meet the soft bit reliability threshold. In other words, it is determined whether or not a minimum permissible number of bits of the buffer data for the candidate control channel are considered sufficiently reliable. For example, the buffer data reliability threshold may be a set number, a set ratio, and/or a set percentage of the total number of bits of the buffer data for the candidate control channel. As a more specific example, in some embodiments, the buffer data reliability threshold may be 50%. Embodiments are not limited to any particular soft bit reliability threshold or to any particular buffer date reliability threshold. The soft bit reliability threshold and/or the buffer data reliability threshold may be adjusted over time.

For example, one or both thresholds may be adjusted responsive to changes in channel conditions.

If, the number of the soft bits of a candidate control channel that meet the soft bit reliability threshold meets the buffer data reliability threshold (yes path, block 906), then the decoded data is encoded to produce re-encoded data 908. If the number of the soft bits of a candidate control channel that meet the soft bit reliability threshold does not meet the buffer data reliability threshold (no path, block 906), then the method ends. In the example where the buffer data reliability threshold is 50%, if at least 50% of the soft buffer data bits for the candidate control channel do meet the soft bit reliability threshold, then the decoded buffer data is re-encoded as described above with respect to the other figures. However, the 50% threshold is not met, then it is determined that the buffer data has not met a minimum reliability requirement, and the data of the buffer for the candidate control channel is deemed to not contain a valid CI. In this example, if the buffer data fails this reliability threshold test, the functions shown in blocks 908, 910 and 912 of FIG. 9 are not performed.

At block 910, if the decoded data was encoded at block 908, then the re-encoded data is compared with the buffer data for the candidate control channel. At block 912, the decoded data is treated as control information dependent on the comparison of the re-encoded data with the buffer data.

In this example, the buffer data reliability check (blocks 904 and 906) occur after the buffer data for the candidate control channel has been blind decoded. However, in some embodiments, this step occurs before the blind decoding process. This buffer data reliability check may alternatively be performed subsequent to any one or more of blocks 908, 910 and 912 shown in FIG. 9. Embodiments are not limited to any particular sequence for performing the buffer data reliability check. Furthermore, in some embodiments, the buffer data reliability check is omitted.

In some embodiments, the buffer data reliability check may be performed without performing any of the CI validation steps shown in blocks 908, 910 and 912 of FIG. 9. In other words, the method may omit encoding the decoded data; comparing the re-encoded with the buffer data for the candidate control channel; and treating the decoded data as control information dependent on the comparison of the re-encoded data with the buffer data, even if the buffer data reliability threshold is passed. In this example, decoded buffer data containing a possible CI (for example, a possible CI that has passes a CRC check) may simply be treated as a valid CI if the buffer data reliability check is passed.

Figure 10:
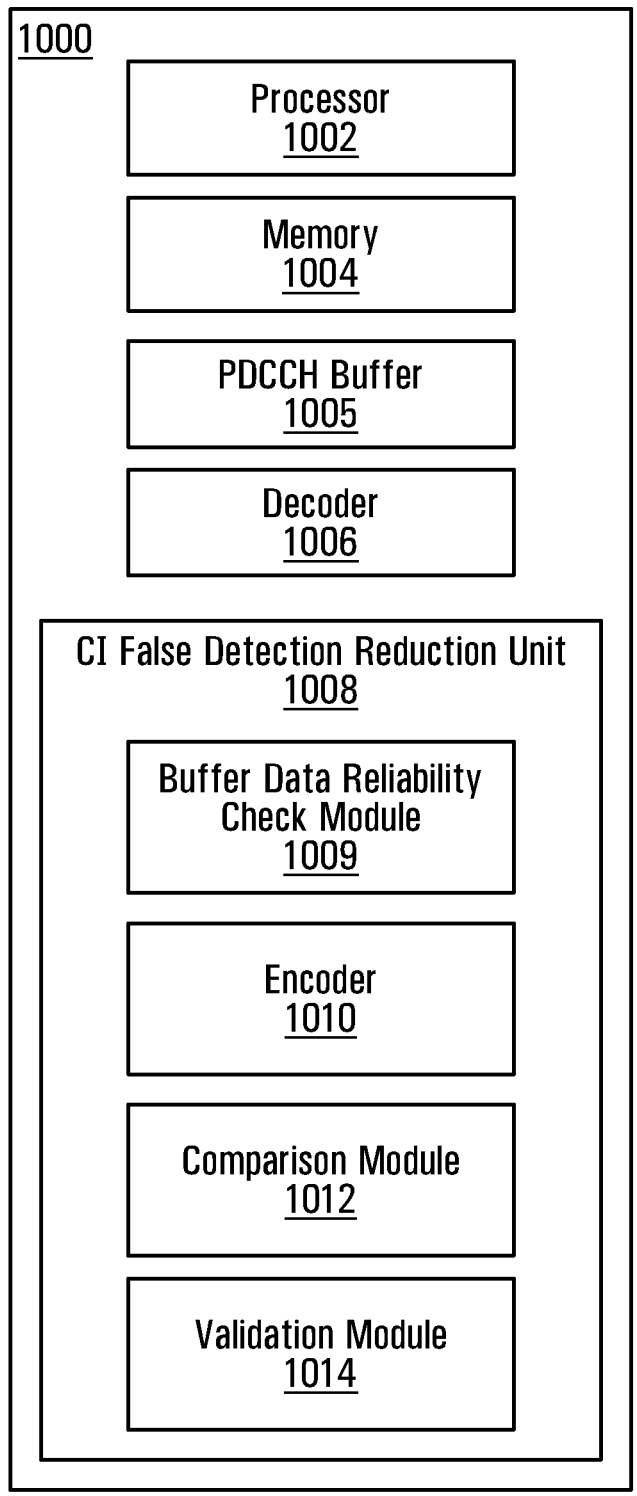
FIG. 10 is a block diagram of an example apparatus that may implement the method of FIG. 9.

FIG. 10 is a block diagram of an example apparatus 1000 that may implement the method of FIG. 9. The apparatus 1000 may be part of a mobile device. The apparatus 1000 includes a processor 1002, a memory 1004, a PDCCH buffer 1005, a decoder 1006, and a CI false detection reduction unit 1008. The CI false detection reduction unit 1008, in this example, includes a buffer data reliability check module 1009, an encoder 1010, a comparison module 1012, and a validation module 1014. The decoder 1006, the encoder, 1010, the comparison module 1012, and the validation module 1014 may be similar to the decoder 306, the encoder, 310, the comparison module 312, and the validation module 314 shown in FIG. 3. The PDCCH buffer 1005 may be similar to the PDCCH buffer 505 shown in FIG. 5. However, as explained above, embodiments are not limited to LTE systems with PDCCH buffers.

The apparatus 1000, in this example, decodes soft data bits from a buffer containing soft data bits. In this example, the buffer data reliability check module 1009 checks the data of the buffer data for a candidate control channel decoded by the decoder 1006. Specifically, the buffer data reliability check module 1009 determines a number of the soft bits of the candidate control channel that meet a soft bit reliability threshold. The buffer data reliability check module 1009 also determines whether said number (of soft bits that meet the soft bit reliability threshold) meets a buffer data reliability threshold. If the buffer data reliability threshold is not met, then the encoder 1010 does not re-encode the decoded data, and, therefore, the comparison module 1012 does not compare re-encoded data to the buffer data for the candidate control channel, and the validation module 1014 does not treat the decoded CI as valid. Instead, because a minimum reliability threshold of the buffer data has not been met, the decoded data is assumed to be a false CI. The decoded data may be ignored or discarded such that it is never passed to the encoder 1010.

It is to be understood that, although the buffer data reliability check module 1009 is shown as part of the CI false detection reduction unit 1008, in this example, the buffer data reliability check module 1009 may also be separate from the CI false detection reduction unit 1008

The CI decoder 1006 and/or the CI false detection reduction unit 1008 (including the buffer data reliability check module 1009, the encoder, 1010, the comparison module 1012, and the validation module 1014) may be implemented as a processor (such as the processor 1002) configured to perform the functions described above. The CI decoder 1006 and/or the CI false detection reduction unit 1008 may be implemented as a memory (such as the memory 1004) containing instructions for execution by a processor (such as the processor 1002), by hardware, or by a combination of instructions stored in a memory and additional hardware, to name a few examples.

If multiple sets of encoders, comparison modules and validation modules are implemented in an apparatus, as in the example show in FIGS. 5 and 8, then the apparatus may also include multiple buffer data reliability check modules. For example, a respective buffer data reliability check module may connect to each encoder. Each buffer data reliability check module may determine whether the buffer data reliability threshold is met by soft bit data for a respective candidate control channel.

Variations and features of embodiments described above with respect to FIGS. 1 to 8 may also be incorporated into the example method shown in FIG. 9 and the example apparatus shown in FIG. 10.

Figure 11:
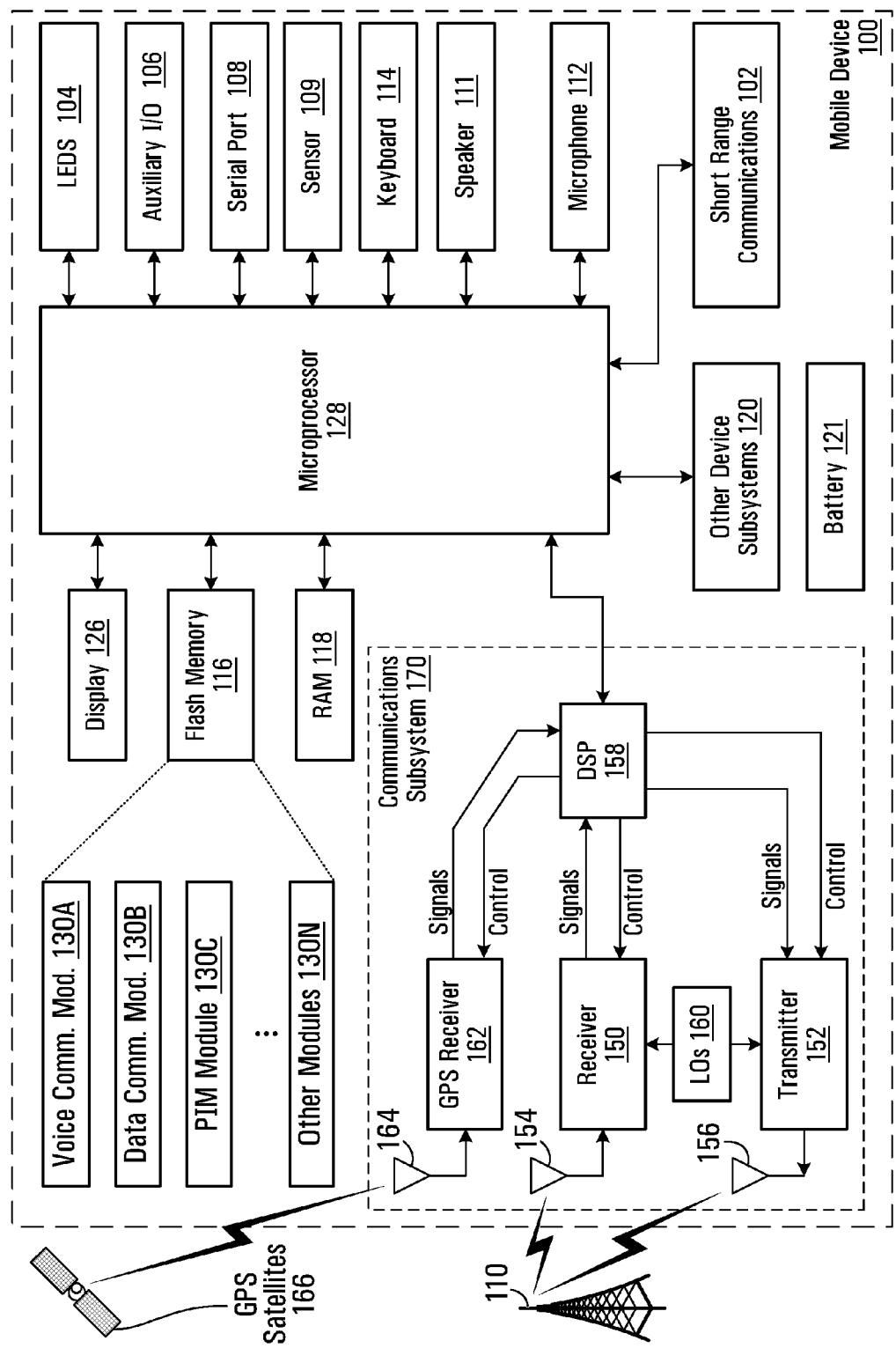
FIG. 11 is a block diagram of an example mobile device.

FIG. 11 shows block diagram a mobile 100 device that may implement the methods described herein. The mobile device 100 is shown with specific components for implementing features similar to those of the apparatuses 300, 500, 700, 800 and 1000 shown in FIGS. 3, 5, 7, 8 and 10 respectively. It is to be understood that the mobile device 100 is shown with very specific details for example purposes only.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 is a type of processor with features similar to those of the processors 302, 502, 702 and 1002 of the apparatuses 300, 500, 700 and 1000 shown in FIGS. 3, 5 and 7 respectively. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some example embodiments a two-way radio frequency (RF) communication device having voice and data communication capabilities. In addition, the mobile device 100 in some example embodiments has the capability to communicate with other computer systems via the Internet.

Operating system software executed by the microprocessor 128 is in some example embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some example embodiments capable of organizing and managing data items, such as e-mail, calendar events, voice mails, appointments, and task items. The PIM application is also in some example embodiments capable of sending and receiving data items via a wireless network 110. In some example embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture. The software modules may include, for example, DCI false detection reduction units 308, 508, 708, 805 or 1009 of FIGS. 3, 5, 7, 8 and 10. Note that the implementations described with reference to FIG. 11 are very specific for example purposes. For example, alternative implementations are possible in which the information updater is not implemented as software and stored on the flash memory 116. More generally, the information updater may be implemented as software, hardware, firmware, or any appropriate combination thereof.

Communication functions, including data and voice communications, are performed through the communications subsystem 170, and possibly through the short-range communications subsystem 102. The communications subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160.

The specific design and implementation of the communications subsystem 170 is dependent upon the communication network in which the mobile device 100 is intended to operate. For example, the communications subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, or an 802.16 WiMAX network or both. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using at least one of the keyboard 114 and some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

According to some aspects, a computer-readable medium is provided having computer-executable instructions stored thereon that, when executed, cause a computer to implement any one of the methods described herein.

The methods described herein are provided as examples. The various functions of blocks of the method flowcharts shown in the Figures and described above may be performed in different orders than described above. Furthermore, in some example embodiments, various blocks of the methods described above may be omitted.

What has been described is merely illustrative of the application of the principles of the disclosure. Other arrangements and methods can be implemented by those skilled in the art without departing from the spirit and scope of the present disclosure.

The invention claimed is:

1. A method comprising:
    performing blind decoding upon buffer data for a candidate control channel to produce decoded data wherein the buffer data comprises soft bits;
    determining a number of the soft bits for the candidate control channel that meet a soft bit reliability threshold
    determining whether said number meets a buffer data reliability threshold;
    encoding the decoded data to generate re-encoded data;
    comparing the re-encoded data with the buffer data for the candidate control channel; and
    treating the decoded data as control information dependent on the comparison of the re-encoded data with the buffer data.

2. The method of claim 1, wherein the decoded data comprises possible control information.

3. The method of claim 1, wherein treating the decoded data as control information dependent on the comparison of the re-encoded data with the buffer data comprises treating the decoded data as either false control information or valid control information as a function of the comparison of the re-encoded data with the buffer data.

4. The method of claim 3, wherein treating the decoded data as valid control information comprises parsing the decoded data, and treating the decoded data as false control information comprises discarding the decoded data.

5. The method of claim 1, wherein the control information is Downlink Control Information (DCI).

6. The method of claim 1, wherein
    comparing the re-encoded data with the buffer data comprises determining a metric as a function of a degree of similarity between the re-encoded data and the buffer data, and
    treating the decoded data as control information dependent on the comparison of the re-encoded data with the buffer data comprises comparing the metric to a threshold.

7. The method of claim 6, wherein
    the metric comprises an average accumulated distance between the soft bits of the buffer data and bits of the re-encoded data.

8. The method of claim 7, wherein:
    the threshold is an average accumulated distance threshold value;
    if the average accumulated distance between the soft bits of the buffer data and the bits of the re-encoded data is greater than or equal to the threshold, then treating the decoded data as control information dependent on the comparison of the re-encoded data with the buffer data further comprises treating the decoded data as false control information; and
    if the average accumulated distance between the soft bits of the buffer data and the bits of the re-encoded data is less than the threshold, then treating the decoded data as control information dependent on the comparison of the re-encoded data with the buffer data further comprises treating the decoded data as valid control information.

9. The method of claim 1, wherein:
    treating the decoded data as the control information dependent on the comparison of the re-encoded data with the buffer data comprises:
    only if said number meets the buffer data reliability threshold, encoding the decoded data to generate re-encoded data, comparing the re-encoded data with the buffer data for the candidate control channel, and treating the decoded data as the control information dependent on the comparison of the re-encoded data with the buffer data.

10. A non-transitory computer readable medium having computer-readable instructions stored thereon that, when executed by a computer, cause the computer to perform the method of claim 1.

11. An apparatus comprising:
    a decoder that performs blind decoding upon buffer data for a candidate control channel to produce decoded data, wherein the buffer data comprises soft bits
    a soft bit reliability checking module that determines a number of the soft bits for the candidate control channel that meet a soft bit reliability threshold, and determines whether said number meets a buffer data reliability threshold;
    an encoder that encodes the decoded data to generate re-encoded data;
    a comparison module that compares the re-encoded data with buffer data for the candidate control channel; and
    a validation module that treats the decoded data as control information dependent on the comparison of the re-encoded data with the buffer data.

12. The apparatus of claim 11, wherein the decoded data comprises possible control information.

13. The apparatus of claim 11, wherein treating the decoded data as control information dependent on the comparison of the re-encoded data with the buffer data comprises treating the decoded data as either false control information or valid control information as a function of the comparison of the re-encoded data with the buffer data.

14. The apparatus of claim 13, further comprising a control information parser unit, wherein
- treating the decoded data as valid control information comprises passing the decoded data to the control information parser unit; and
- treating the decoded data as false control information comprises not passing the decoded data to the control information parser unit.

15. The apparatus of claim 11, wherein the control information is Downlink Control Information (DCI).

16. The apparatus of claim 11, wherein the comparison module determines a metric as a function of a degree of similarity between the re-encoded data and the buffer data; and
- the validation module compares the metric to a threshold.

17. The apparatus of claim 16, wherein:
- the metric determined by the comparison module is an average accumulated distance between the soft bits of the buffer data and bits of the re-encoded data.

18. The apparatus of claim 17, wherein:
- the threshold is an average accumulated distance threshold value;
- if the average accumulated distance between the soft bits of the buffer data and the bits of the re-encoded data is greater than or equal to the threshold, then treating the decoded data as control information dependent on the comparison of the re-encoded data with the buffer data further comprises treating the decoded data as false control information; and
- if the average accumulated distance between the soft bits of the buffer data and the bits of the re-encoded data is less than the threshold, then treating the decoded data as control information dependent on the comparison of the re-encoded data with the buffer data further comprises treating the decoded data as valid control information.

19. The apparatus of claim 11, wherein:
- the candidate control channel is one of a plurality of candidate control channels and the buffer data comprises respective buffer data for each of the plurality of candidate control channels;
- the decoded data is one of a plurality of decoded data messages, each decoded data message corresponding to a respective one of the plurality of candidate control channels;
- the encoder is one of a plurality of encoders, each encoder encoding a respective one of the plurality of decoded data messages to produce respective re-encoded data;
- the comparison module is one of a plurality of comparison modules, each comparison module corresponding to a respective one of the plurality of encoders, and each comparison module comparing the respective re-encoded data with the respective buffer data; and
- the validation module is one of a plurality or validation modules, each validation module corresponding to a respective one of the plurality of comparison modules, and each validation module treating the respective decoded data message as respective control information dependent on the comparison of the respective re-encoded data with the respective buffer data.

20. The apparatus of claim 19, further comprising a control information parser unit, wherein
- each comparison module determines a respective metric as a function of a degree of similarity between the respective re-encoded data and the respective buffer data, and
- treating the decoded data as control information dependent on the comparison of the re-encoded data with the buffer data comprises, for each of the plurality of decoded data messages, either passing the decoded data message together with the respective metric to the parser unit or discarding the decoded data message as a function of the comparison.

21. The apparatus of claim 11, wherein:
- only if said number meets the buffer data reliability threshold, the encoder encodes the decoded data to generate re-encoded data, the comparison module compares the re-encoded data with the buffer data for the candidate control channel, and the validation module treats the decoded data as control information dependent on the comparison of the re-encoded data with the buffer data.

* * * * *

UNITED STATES PATENT AND TRADEMARK OFFICE
CERTIFICATE OF CORRECTION

PATENT NO. : 8,843,792 B2  Page 1 of 1
APPLICATION NO. : 13/524492
DATED : September 23, 2014
INVENTOR(S) : Xing Qian et al.

It is certified that error appears in the above-identified patent and that said Letters Patent is hereby corrected as shown below:

IN THE CLAIMS:
Claim 19, column 26, line 13 delete "or" and insert --of--.

Signed and Sealed this
Sixth Day of January, 2015

Michelle K. Lee
*Deputy Director of the United States Patent and Trademark Office*